United States Patent
Sekine et al.

(10) Patent No.: US 10,919,145 B2
(45) Date of Patent: Feb. 16, 2021

(54) HORIZONTALLY ARTICULATED ROBOT

(71) Applicant: Seiko Epson Corporation, Tokyo (JP)

(72) Inventors: Kotaro Sekine, Matsumoto (JP);
Ryosuke Teranaka, Matsumoto (JP)

(73) Assignee: Seiko Epson Corporation

( * ) Notice: Subject to any disclaimer, the term of this patent is extended or adjusted under 35 U.S.C. 154(b) by 414 days.

(21) Appl. No.: 15/601,136

(22) Filed: May 22, 2017

(65) Prior Publication Data
US 2017/0341222 A1    Nov. 30, 2017

(30) Foreign Application Priority Data

May 26, 2016 (JP) .............................. JP2016-105475
Feb. 16, 2017 (JP) .............................. JP2017-027042

(51) Int. Cl.
| | |
|---|---|
| *B25J 9/04* | (2006.01) |
| *G05B 19/18* | (2006.01) |
| *B25J 9/00* | (2006.01) |
| *B25J 9/12* | (2006.01) |

(52) U.S. Cl.
CPC .............. *B25J 9/04* (2013.01); *B25J 9/0009* (2013.01); *B25J 9/042* (2013.01); *B25J 9/126* (2013.01); *G05B 19/18* (2013.01)

(58) Field of Classification Search
None
See application file for complete search history.

(56) References Cited

U.S. PATENT DOCUMENTS

| | | | | |
|---|---|---|---|---|
| 3,227,290 A | * | 1/1966 | Lemelson ................... | B25J 5/02 414/735 |
| 4,458,566 A | * | 7/1984 | Tajima ...................... | B23Q 7/04 414/4 |
| 4,532,757 A | * | 8/1985 | Tutle ....................... | A01D 46/24 382/110 |
| 4,973,215 A | * | 11/1990 | Karlen ....................... | B25J 9/04 414/729 |
| 5,000,653 A | * | 3/1991 | Gosdowski .............. | B25J 9/042 414/744.5 |
| 5,193,405 A | * | 3/1993 | Oomichi .................... | B25J 5/00 73/865.8 |
| 5,655,412 A | * | 8/1997 | Luik .................... | B23K 20/123 74/490.01 |
| 6,439,076 B1 | * | 8/2002 | Flemmer .................... | B25J 9/04 74/490.03 |
| 8,607,658 B2 | * | 12/2013 | Ono ......................... | B25J 9/044 74/490.01 |
| 9,751,218 B2 | * | 9/2017 | Kawase ................. | B25J 9/0009 |
| 2005/0166699 A1 | * | 8/2005 | Meyerhoff .............. | B25J 9/044 74/490.01 |
| 2006/0242818 A1 | * | 11/2006 | Penick .................. | B23Q 1/012 29/560 |

(Continued)

FOREIGN PATENT DOCUMENTS

| | | | |
|---|---|---|---|
| DE | 102008026295 | * | 12/2009 |
| JP | 2011-177845 A | | 9/2011 |
| WO | WO2010006812 | * | 1/2010 |

*Primary Examiner* — William Kelleher
*Assistant Examiner* — Gregory T Prather
(74) *Attorney, Agent, or Firm* — Harness, Dickey & Pierce, P.L.C.

(57) ABSTRACT

A horizontally articulated robot includes a base, a first arm provided at the base, and a control device controlling the first arm, in which at least a part of the control device is located inside the base.

12 Claims, 10 Drawing Sheets

(56) References Cited

U.S. PATENT DOCUMENTS

| | | | |
|---|---|---|---|
| 2007/0192910 A1* | 8/2007 | Vu | B25J 5/007 700/245 |
| 2009/0173561 A1* | 7/2009 | Moriguchi | B25J 5/007 180/167 |
| 2012/0279341 A1* | 11/2012 | Ono | B25J 9/044 74/490.01 |
| 2015/0094836 A1* | 4/2015 | Rivers | B23B 25/06 700/97 |
| 2016/0135816 A1* | 5/2016 | Lavallee | A61B 17/15 606/88 |
| 2017/0027652 A1* | 2/2017 | Johnson | B25J 9/1633 |
| 2017/0341221 A1* | 11/2017 | Hashimoto | B25J 5/00 |
| 2017/0341223 A1* | 11/2017 | Hahakura | B25J 19/0029 |
| 2017/0360521 A1* | 12/2017 | Johnson | A61B 34/74 |
| 2018/0006518 A1* | 1/2018 | Masai | B25J 9/046 |
| 2018/0056506 A1* | 3/2018 | Nishimura | B25J 9/042 |
| 2018/0056507 A1* | 3/2018 | Hahakura | H02K 11/33 |
| 2018/0056508 A1* | 3/2018 | Hahakura | B25J 9/044 |
| 2018/0178375 A1* | 6/2018 | Yang | B25J 5/007 |
| 2018/0219461 A1* | 8/2018 | Hama | H02K 11/33 |
| 2018/0360550 A1* | 12/2018 | Nakanishi | B25J 9/08 |
| 2019/0111524 A1* | 4/2019 | Abdollahi | B23K 9/0286 |
| 2019/0118378 A1* | 4/2019 | Ludban | B25J 9/1664 |

* cited by examiner

HORIZONTALLY ARTICULATED ROBOT

BACKGROUND

1. Technical Field

The present invention relates to a horizontally articulated robot.

2. Related Art

A horizontally articulated robot is used in an industrial field and the like. A horizontally articulated robot is connected to a control device (controller), and is controlled by the control device. As an example of the horizontally articulated robot, there is a scalar robot.

In the related art, the horizontally articulated robot and the control device are disposed to be separated from each other (for example, refer to JP-A-2011-177845).

However, in the configuration in which the horizontally articulated robot and the control device are disposed to be separated from each other, an installation area (footprint) for disposing the horizontally articulated robot and the control device may increase, and thus an installation location may be restricted.

SUMMARY

An aspect of the invention is directed to a horizontally articulated robot including a base; a first arm provided at the base; and a control device controlling the first arm, in which at least a part of the control device is located inside the base.

With this configuration, in the horizontally articulated robot, at least a part of the control device controlling the first arm provided at the base is located inside the base. Consequently, in the horizontally articulated robot, it is possible to reduce a footprint.

In the aspect of the invention, the horizontally articulated robot may be configured such that the first arm is directly or indirectly provided at the base so as to be rotationally moved about a first rotation shaft, and the horizontally articulated robot further includes a first casing having a portion overlapping the base when viewed from a shaft direction of the first rotation shaft.

With this configuration, the horizontally articulated robot includes the first casing having a portion overlapping the base when viewed from the shaft direction of the first rotation shaft of the first arm. Consequently, in the horizontally articulated robot, it is possible to accommodate a constituent element such as the control device in the first casing, and also to reduce a footprint.

In the aspect of the invention, the horizontally articulated robot may be configured such that the control device includes a power source board that supplies power to a first drive unit driving the first arm, and at least a part of the power source board is located inside the first casing.

With this configuration, in the horizontally articulated robot, at least a part of the power source board supplying power to the first drive unit driving the first arm is located inside the first casing. Consequently, in the horizontally articulated robot, it is possible to accommodate at least a part of the power source board in the first casing, and also to reduce a footprint.

In the aspect of the invention, the horizontally articulated robot may be configured such that the control device further includes a control board controlling the first drive unit, and the control board is located inside the base.

With this configuration, in the horizontally articulated robot, the control board controlling the first drive unit is located inside the base. Consequently, in the horizontally articulated robot, it is possible to accommodate the control board in the base, and also to reduce a footprint.

In the aspect of the invention, the horizontally articulated robot may be configured such that the first drive unit is located inside the first casing.

With this configuration, in the horizontally articulated robot, the first drive unit is located inside the first casing. Consequently, in the horizontally articulated robot, it is possible to accommodate the first drive unit in the first casing, and also to reduce a footprint.

In the aspect of the invention, the horizontally articulated robot may be configured such that the first drive unit includes a motor, and an amplification unit provided with a drive circuit driving the motor, and the amplification unit is provided in the motor.

With this configuration, in the horizontally articulated robot, the amplification unit having the drive circuit driving the motor is provided in the motor. Consequently, in the horizontally articulated robot, the amplification unit and the motor can be integrally formed, and thus wirings connecting the constituent elements to each other can be shortened.

In the aspect of the invention, the horizontally articulated robot may be configured to further include a display portion provided on the first casing.

With this configuration, the horizontally articulated robot includes the display portion provided on the first casing. Consequently, in the horizontally articulated robot, it is possible to display information by using the display portion.

In the aspect of the invention, the horizontally articulated robot may be configured such that the display portion is located on a front surface of the first casing.

With this configuration, in the horizontally articulated robot, the display portion is located on the front surface of the first casing. Consequently, in the horizontally articulated robot, it is possible to easily view information displayed by the display portion from the front surface of the first casing.

In the aspect of the invention, the horizontally articulated robot may be configured such that the display portion has a portion located in a movable region of the first arm when viewed from the shaft direction of the first rotation shaft.

With this configuration, in the horizontally articulated robot, the display portion has a portion located in a movable region of the first arm when viewed from the shaft direction of the first rotation shaft. Consequently, in the horizontally articulated robot, it is possible to easily view information displayed by the display portion from a direction in which the movable region of the first arm is viewed.

In the aspect of the invention, the horizontally articulated robot may be configured such that a position where the display portion is provided on the first casing can be changed.

With this configuration, in the horizontally articulated robot, a position where the display portion is provided on the first casing can be changed. Consequently, in the horizontally articulated robot, a position of the display portion can be changed, and thus it is possible to easily view information displayed by the display portion depending on a use situation.

In the aspect of the invention, the horizontally articulated robot may be configured such that the first casing has an opening.

With this configuration, in the horizontally articulated robot, the first casing has the opening. Consequently, in the horizontally articulated robot, it is possible to dissipate heat by using the opening of the first casing.

In the aspect of the invention, the horizontally articulated robot may be configured to further include a second arm that is provided at the first arm so as to be rotationally moved about a second rotation shaft, and a protection member that connects the first casing and the second arm to each other.

With this configuration, the horizontally articulated robot further includes the protection member that connects the second arm provided at the first arm so as to be rotationally moved about the second rotation shaft to the first casing. Consequently, in the horizontally articulated robot, it is possible to accommodate wirings in the protection member.

In the aspect of the invention, the horizontally articulated robot may be configured such that a first connection position between the first casing and the protection member and a second connection position between the second arm and the protection member are the same as each other in terms of a position in the shaft direction of the first rotation shaft.

With this configuration, in the horizontally articulated robot, the first connection position between the first casing and the protection member and the second connection position between the second arm and the protection member are the same as each other in terms of a position in the shaft direction of the first rotation shaft. Consequently, in the horizontally articulated robot, it is possible to reduce the risk of disconnection of wirings accommodated in the protection member.

In the aspect of the invention, the horizontally articulated robot may be configured such that the first connection position is located on an axis of the first rotation shaft.

With this configuration, in the horizontally articulated robot, the first connection position is located on an axis of the first rotation shaft. Consequently, in the horizontally articulated robot, it is possible to accommodate wirings in the protection member in the arrangement in which the first connection position between the first casing and the protection member is located on an axis of the first rotation shaft.

As mentioned above, according to the horizontally articulated robot of the aspect of the invention, at least a part of the control device controlling the first arm provided at the base is located inside the base. Consequently, in the horizontally articulated robot of the aspect of the invention, it is possible to reduce a footprint.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described in detail with reference to the drawings.

In the following embodiment, the terms such as "horizontal", "perpendicular", "identical (the same)", and "equal" include a case of slight deviation due to, for example, design errors or manufacturing errors. In other words, aspects such as "horizontal", "perpendicular", "identical (the same)", and "equal" respectively include aspects such as "substantially horizontal", "substantially perpendicular", "substantially identical (the substantially same)", and "substantially equal".

Brief of Robot System

Figure 1:
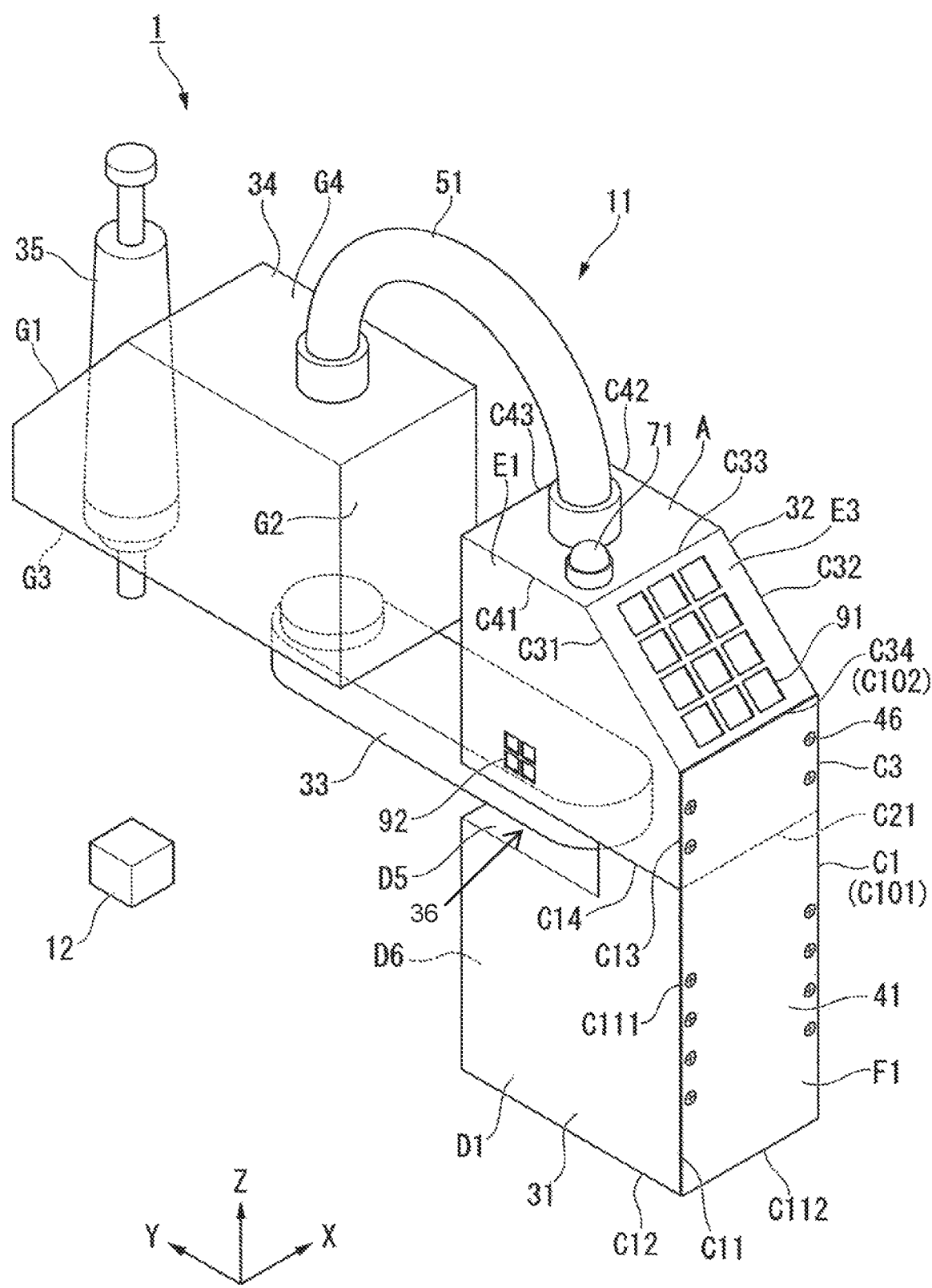
FIG. 1 is a perspective view illustrating a schematic configuration example of a robot system including a horizontally articulated robot according to an embodiment of the invention.

FIG. 1 is a perspective view illustrating a schematic configuration example of a robot system 1 including a horizontally articulated robot 11 according to an embodiment of the invention.

Figure 2:
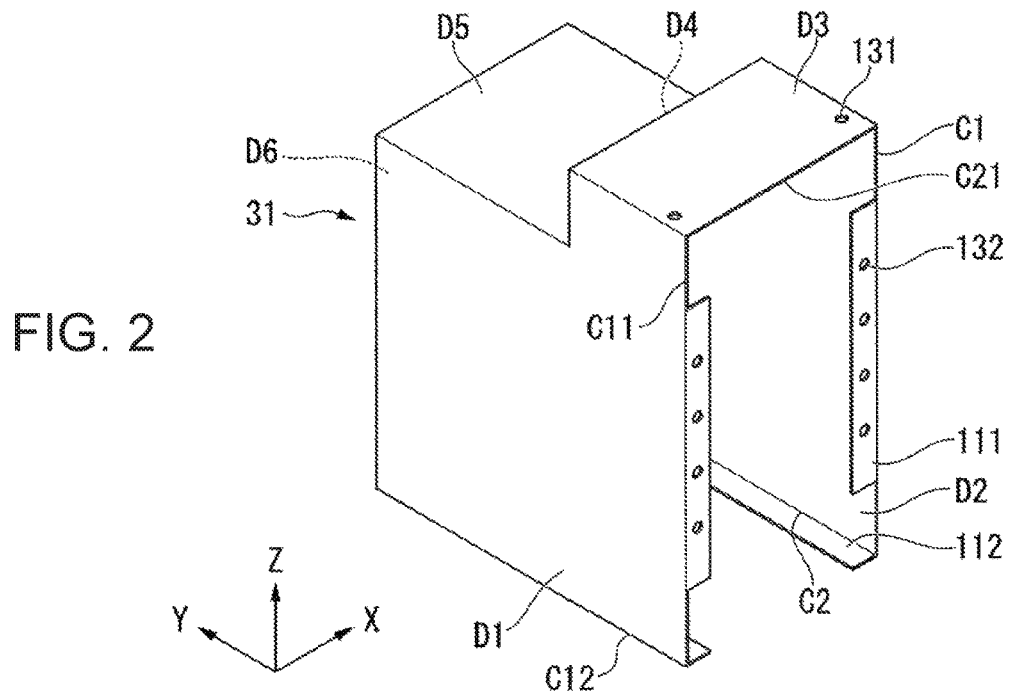
FIG. 2 is a perspective view illustrating a schematic configuration example of a base of the horizontally articulated robot according to the embodiment of the invention.

FIG. 2 is a perspective view illustrating a schematic configuration example of a base 31 of the horizontally articulated robot 11 according to the embodiment of the invention.

Figure 3:
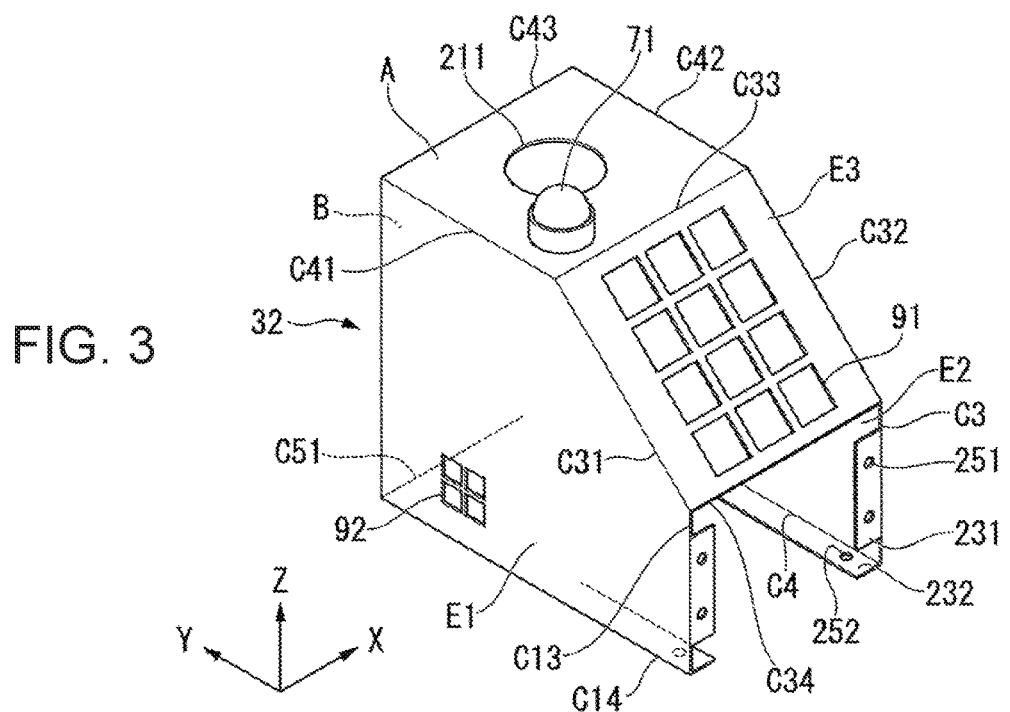
FIG. 3 is a perspective view illustrating a schematic configuration example of a casing of the horizontally articulated robot according to the embodiment of the invention.

FIG. 3 is a perspective view illustrating a schematic configuration example of a casing 32 of the horizontally articulated robot 11 according to the embodiment of the invention.

Figure 4:
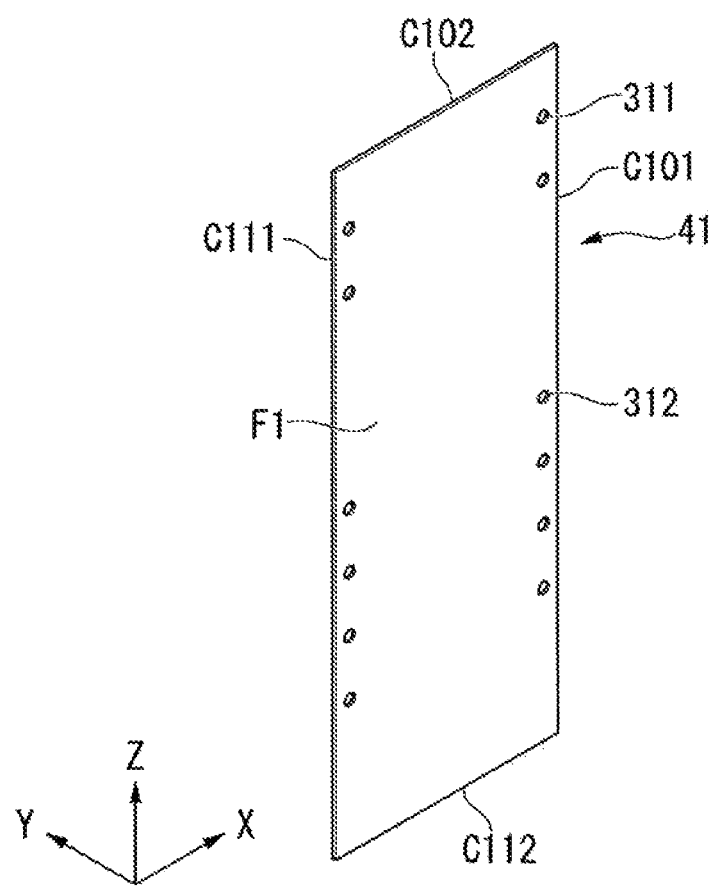
FIG. 4 is a perspective view illustrating a schematic configuration example of a cover plate of the horizontally articulated robot according to the embodiment of the invention.

FIG. 4 is a perspective view illustrating a schematic configuration example of a cover plate 41 of the horizontally articulated robot 11 according to the embodiment of the invention.

For convenience of description, FIGS. 1 to 4 illustrate an XYZ coordinate system which is a three-dimensional orthogonal coordinate system. FIGS. 2, 3 and 4 respectively illustrate the base 31, the casing 32, and the cover plate 41 in a direction matching arrangement of the horizontally articulated robot 11 illustrated in FIG. 1.

In the present embodiment, an arrow on each coordinate axis in the XYZ coordinate system indicates a direction directed from a negative side toward a positive side along each axis. That is, a direction of the arrow on each axis indicates a direction from the negative side to the positive side, and a direction reverse to the arrow indicates a direction from the positive side to the negative side.

The robot system 1 includes the horizontally articulated robot 11 and a target object 12. The robot system 1 may be understood as not including the target object 12, that is, the target object 12 may be understood as an external object of the robot system 1.

In the present embodiment, the horizontally articulated robot 11 operates with the target object 12 as a processing target object.

Here, the target object 12 may be any object, and may be, for example, an object (non-living body) which is not an living body, and may be a living body.

In the example illustrated in FIG. 1, a single target object 12 is illustrated, but a plurality of target objects 12 may be used.

Brief of Horizontally Articulated Robot

The horizontally articulated robot 11 includes the base 31, the casing 32, an arm (hereinafter, also referred to as a "first arm") 33, an arm (hereinafter, also referred to as a "second arm") 34, an operation unit 35, and a pipe 51.

Schematically, the base 31 and the casing 32 are fixed to each other by the cover plate 41; the first arm 33 is provided to be rotationally moved with respect to the base 31; the second arm 34 is provided to be rotationally moved with respect to the first arm 33; and the operation unit 35 is provided to be rotationally moved with respect to the second arm 34. One end of the pipe 51 is connected to the casing 32, and the other end of the pipe 51 is connected to the second arm 34. The operation unit 35 may be rotationally moved. As another configuration example, the operation unit 35 may not be linearly moved and may be rotationally moved.

Brief of Base

In the present embodiment, the base 31 is a constituent element which directly supports the first arm 33. As another configuration example, the base 31 may be a constituent element which indirectly supports the first arm 33.

The base 31, which is a pedestal having a substantially rectangular parallelepiped outer shape (or a cubic outer shape), is configured to include tabular surfaces D1 to D6, and is hollow inside. The base 31 is a pedestal having a substantially rectangular parallelepiped outer shape as mentioned above, but has a shape in which a portion (a part) including the whole of one side (a side corresponding to a side C21) protrudes when viewed to face one surface D5. The base 31 has two screw holes 131 on the surface D3 of the protruding portion in the protrusion direction. The base 31 is substantially open with respect to remaining surfaces (that is, surfaces other than the surfaces D1 to D3) including one side C21 including the protruding portion, and has tabular portions 111 along sides C1 and C11 at the sides C1 and C11 respectively connected to both ends of one side C21. The tabular portions 111 have four screw holes 132 along each of the sides C1 and C11, that is, a total of eight screw holes 132 along both of the sides C1 and C11. The base 31 is substantially open with respect to a surface facing the surface D3 of the protruding portion in the protrusion direction, and has tabular portions 112 along sides C2 and C12 at the sides C2 and C12 respectively connected to the sides C1 and C11.

In the present embodiment, in the base 31, only one of the two screw holes 131 is given the reference numeral, only one of the two tabular portions 111 is given the reference numeral, only one of the four screw holes 132 (a total of eight screw holes 132 with respect to the two tabular portions 111) is given the reference numeral, and only one of the two tabular portions 112 is given the reference numeral.

Here, in the illustrated example, the base 31 is formed of the sides parallel to an X axis, a Y axis, and a Z axis; the protruding portion protrudes in the positive direction of the Z axis; the protruding portion is a portion which is located in the negative direction of the Y axis when viewed to face the surface D5 which is parallel to an XY plane, and which includes the whole of one side (corresponding to the side C21) which is parallel to the X axis; the two screw holes 131 are disposed along one side C21; and the two screw holes 131 are disposed at positions which are symmetric in the positive direction and the negative direction of the X axis with respect to the midpoint (a line which is parallel to the Z axis passing through the midpoint) of one side C21. In the illustrated example, the two tabular portions 111 and the eight screw holes 132 of the tabular portions 111 are disposed at positions which are symmetric in the positive direction and the negative direction of the X axis with respect to the midpoint (a line which is parallel to the Z axis passing through the midpoint) of one side C21.

In the illustrated example, the surface D1 and the surface D2 face each other in parallel; the open surface on the side where the tabular portions 111 are provided and the surface D6 face each other in parallel; and the open surface on the side where the tabular portions 112 are provided, and the surface D3 and the surface D5 face each other in parallel. The surface D3 protrudes in the positive direction of the Z axis with respect to the surface D5, and the surface D3 is connected to the surface D5 via the surface D4.

Brief of Casing

The casing 32 has surfaces (pentagonal surfaces E1 and E2) with a shape in which, with respect to two surfaces (surfaces corresponding to the surfaces E1 and E2) facing each other forming a rectangular parallelepiped outer shape, a triangular portion including a single vertex of each of the two surfaces is cut off in a direction perpendicular to the two surfaces so as to be removed. Here, the surfaces (pentagonal surfaces E1 and E2) with a shape in which the portion is cut off may not necessarily be formed through a process of cutting off the portion, and may be formed, for example, through a process of forming the same shape from the beginning. The casing 32, which has a polygonal shape as an outer shape, is configured to include tabular surfaces E1 to E3, and is hollow inside.

As mentioned above, in the present embodiment, a case where the casing 32 has the surfaces (pentagonal surfaces E1 and E2) with a shape obtained by cutting off the portion (for example, a corner portion) is described, but, as another configuration example, the casing 32 may have any shape, and, for example, instead of the surfaces (pentagonal surfaces E1 and E2) with a shape obtained by cutting off the portion (for example, a corner portion) in the present embodiment, the casing 32 may have surfaces with any shape.

The casing 32 has the two pentagonal surfaces E1 and E2 facing each other. The pentagonal surfaces respectively have shapes including linear sides C31 and C32 (also referred to as "oblique sides") which connect points in the middle of two adjacent rectangular (or square) sides (two sides C41 and C13 or two sides C42 and C3) to each other. The casing 32 has a surface E3 (hereinafter, also referred to as an "oblique surface") which is perpendicular to the two pentagonal surfaces E1 and E2 and includes the two oblique sides C31 and C32, a surface A which is perpendicular to the two pentagonal surfaces E1 and E2 and includes the sides C41 and C42 connected to the oblique sides C31 and C32 in the respective pentagons, and a surface B which is perpendicular to the two pentagonal surfaces E1 and E2 and includes a side C43 connected to the sides C41 and C42 in the respective pentagons.

The oblique surface E3 and the surface A have a common side C33. Remaining one side C34 side of the oblique surface E3 is hollow.

The casing 32 is substantially open with respect to a surface which is excluded from the pentagon connected to the oblique surface E3 and is opposite to the surface A, and has tabular portions 231 along the sides C3 and C13 at the two sides C3 and C13 connected to the oblique surface E3. Each of the tabular portions 231 has two screw holes 251 along the sides C3 and C13. The casing 32 is also substantially open with respect to a remaining surface including the sides C4 and C14 connected to the C3 and C13, and has tabular portions 232 along the sides C4 and C14. Each of the tabular portions 232 has a single screw hole 252 around each of the sides C4 and C14.

The casing 32 has a hole portion 211 on the surface A. The pipe 51 is accommodated in the hole portion 211. Here, in the present embodiment, the hole portion 211 has a circular shape, but may have any shape as another configuration example.

The casing 32 has a lamp 71 on the surface A. For example, the lamp 71 is used to notify a user of a warning or the like through lighting (or blinking) in the horizontally articulated robot 11. The warning or the like may be, for example, a warning for notifying that any one or two or more motors (for example, motors 471-1 to 471-3 illustrated in FIG. 5) are driven (that is, the horizontally articulated robot 11 is operated).

The casing 32 has openings 91 on the oblique surface E3, and has openings 92 on one surface E1 of the two pentagonal surfaces E1 and E2. In the present embodiment, the openings 91 and 92 are provided to dissipate heat.

Here, each of the openings 91 and the openings 92 has a square shape (or a rectangular shape) in the present embodiment, and may have any shape as another configuration example.

Either the openings 91 or the openings 92 or both thereof may be provided with a net covering the open portions (hole portions). In this case, the net can prevent a person's finger or an object from entering the casing 32 from the outside of the casing 32 through the openings 91 or the openings 92. Consequently, for example, in a case where a current flows inside the casing 32 or a voltage is applied, it is possible to prevent the person's finger or the object from contact with a flowing current or an applied voltage.

In the present embodiment, in the casing 32, only one of the two tabular portions 231 is given the reference numeral; only one of the two screw holes 251 (a total of four screw holes 251 with respect to the two tabular portions 231) is given the reference numeral; only one of the two tabular portions 232 is given the reference numeral; and only one of the screw holes 252 of the two tabular portions 232 (a total of two screw holes 252 with respect to the two tabular portions 232) is given the reference numeral.

In the present embodiment, in the casing 32, only one of the twelve openings 91 on the oblique surface E3 is given the reference numeral, and only one of the four openings 92 on the pentagonal surface E1 is given the reference numeral. In the present embodiment, the twelve openings 91 are disposed at an equal interval in four rows and three columns (any directions of rows and columns may be used) on the oblique surface E3, but other arrangements may be used. Similarly, the four openings 92 are disposed at an equal interval in two rows and two columns (any directions of rows and columns may be used) on the pentagonal surface E1, but other arrangements may be used.

In the present embodiment, among the plurality of surfaces of the casing 32, the openings 91 are provided on one of the two surfaces E3 and E1, and the openings 92 are provided on the other surface so that air easily flows between the openings 91 and the openings 92, but any other configuration may be used. For example, the openings 91 and the openings 92 may be provided any surfaces of the casing 32. Either the openings 91 or the openings 92 may be provided.

Here, in the illustrated example, the casing 32 is formed of the sides which are respectively parallel to the X axis, the Y axis, the Z axis except for the oblique sides C31 and C32. In the illustrated example, the two pentagonal surfaces E1 and E2 are parallel to the YZ plane, the openings 92 are provided on the pentagonal surface E1 located in the negative direction of the X axis, and openings are not provided on the pentagonal surface E2 (a pentagonal surface located in the positive direction of the X axis) on an opposite side thereto. In the illustrated example, the surface A is parallel to the XY plane, the surface B is parallel to the XZ plane, and the oblique surface E3 is perpendicular to the YZ plane. In the illustrated example, the two tabular portions 231 are parallel to the XZ plane, and the two tabular portions 232 are parallel to the XY plane. In the illustrated example, the two tabular portions 231 and the two screw holes 251 provided in each of the two tabular portions 231 are disposed at positions which are symmetric in the positive direction and the negative direction of the X axis with respect to the midpoint (a line parallel to the Z axis passing through the midpoint) of the single side C34 which is located on a surface (a surface parallel to the XZ plane) on which the tabular portions 231 are present and is in common to the oblique surface E3. In the illustrated example, the two tabular portions 232 and the two screw holes 252 provided in each of the two tabular portions 232 are disposed at positions which are symmetric in the positive direction and the negative direction of the X axis with respect to the midpoint (a line parallel to the Y axis passing through the midpoint) of a single side C51 which is located on a surface (a surface parallel to the XY plane) on which the tabular portions 232 are present and is in common to the surface B.

As mentioned above, in the present embodiment, the openings 91 and 92 are provided on the surfaces E3 and E1 of the casing 32. Consequently, heat dissipation can be performed.

In the example illustrated in FIG. 3, the openings 91 and 92 are respectively provided on two (or three or more) different surfaces E3 and E1 of the casing 32. Consequently, air is circulated through the openings 91 and the openings 92, and thus heat dissipation efficiency inside the casing 32 can be increased due to air convection.

Figure 5:
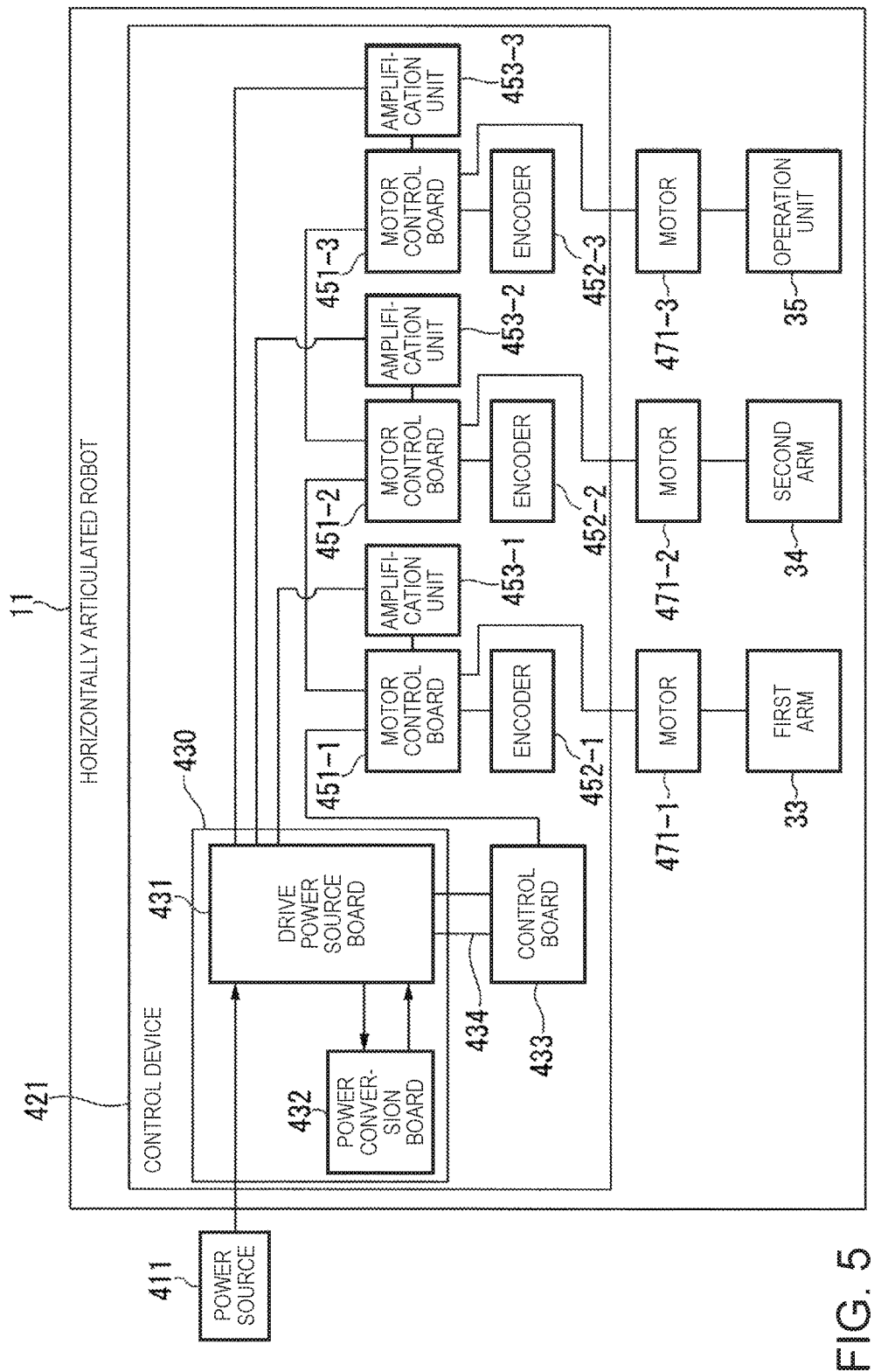
FIG. 5 is a diagram illustrating a schematic configuration example of a control system of the horizontally articulated robot according to the embodiment of the invention.

In the present embodiment, the openings 91 and 92 are used for heat dissipation, and thus it is possible to achieve miniaturization, simplification or low cost of a control device or the like compared with a case where, for example, dissipation fins are provided on the control device (for example, a control device 421 illustrated in FIG. 5).

Brief of Cover Plate

The cover plate 41 has a rectangular (or square) tubular surface F1.

The cover plate 41 has six screw holes (two screw holes 311 and four screw holes 312) along each of long sides C101 and C111 of the rectangle.

In the present embodiment, in the cover plate 41, only one of the two screw holes 311 along each of the two sides C101 and C111 (a total of four screw holes 311 with respect to the two sides C101 and C111) is given the reference numeral, and only one of the four screw holes 312 along each of the two sides C101 and C111 (a total of eight screw holes 312 with respect to the two sides C101 and C111) is given the reference numeral.

Here, in the illustrated example, the cover plate 41 has the surface F1 which is parallel to the XZ plane. In the surface F1, the sides C101 and C111 which are parallel to the direction of the Z axis are long sides, sides C102 and C112 which are parallel to the direction of the X axis are short sides.

In the illustrated example, in the surface F1, the two screw holes 311 and the four screw holes 312 are arranged along each of the long sides C101 and C111. The two screw holes 311 are first and second screw holes when the negative direction of the Z axis is viewed from the positive direction of the Z axis, and the four screw holes 312 are third to sixth screw holes when the negative direction of the Z axis is viewed from the positive direction of the Z axis.

Relationship Among Base, Casing, and Cover Plate

Here, the base 31 and the casing 32 have the same length in the direction of the X axis in the surface which is parallel to the XZ plane. In the base 31 and the casing 32, a length of the side which is parallel to the Y axis in the surface where the tabular portions 112 of the base 31 are present is the same as a length of the side which is parallel to the Y axis in the surface where the tabular portions 232 of the casing 32 are present. In other words, a surface which is parallel to the XY plane when the protruding portion of the base 31 is disregarded has the same shape as that of a surface which is parallel to the XY plane when the oblique surface of the casing 32 is disregarded.

In a case where the base 31 and the casing 32 are disposed so that the surfaces overlap each other, a configuration is obtained in which the two screw holes 131 of the base 31 overlap the two screw holes 252 of the casing 32 at the same positions, and a configuration is obtained in which the four screw holes 132 of each of the two tabular portions 111 of the base 31 and the two screw holes 251 of each of the two tabular portions 231 of the casing 32 are linearly disposed along the respective sides (the sides C1 and C3, or the sides C11 and C13).

The long sides C101 and C111 of the rectangle of the cover plate 41 have lengths which are sufficient to cover the tabular portions 111 of the base 31 and the tabular portions 231 of the casing 32 in the direction in which the screw holes 132 and 251 are arranged, and the short sides C102 and C112 of the rectangle have lengths which are sufficient to cover the sides C21 and C34 which are perpendicular to the direction in which the screw holes 132 and 251 of the tabular portions 111 and 231 are arranged. In other words, the cover plate 41 has the surface F1 with a shape which is sufficient to cover the open portions where the tabular portions 111 of the base 31 and the tabular portions 231 of the casing 32 are present.

In a state in which the open portions are covered with the cover plate 41, a configuration is obtained in which the four screw holes 311 of the cover plate 41 overlap the four screw holes 251 of the casing 32 at the same positions, and a configuration is obtained in which the eight screw holes 312 of the cover plate 41 overlap the eight screw holes 132 of the base 31 at the same positions.

As illustrated in FIG. 1, the base 31, the casing 32, and the cover plate 41 are assembled with each other. The base 31 and the casing 32 are fixed to each other as a result of being fastened with screws through the respective screw holes in a state in which the two screw holes 131 of the base 31 overlap the two screw holes 252 of the casing 32.

For example, the base 31 and the casing 32 may be fixed by using a larger number of screw holes (and screws), and may be fastened by using methods other than screw holes (and screws).

As illustrated in FIG. 1, the cover plate 41 is fixed to the base 31 and the casing 32 as a result of being fastened with screws through the respective screw holes in a state in which the four screw holes 251 of the casing 32 overlap the four screw holes 311 of the cover plate 41, and the eight screw holes 132 of the base 31 overlap the eight screw holes 312 of the cover plate 41. Consequently, the base 31 and the casing are integrally fixed to the cover plate 41. FIG. 1 illustrates screws 46, and only one of a total of twelve screws 46 is given the reference numeral.

For example, the cover plate 41 may be fixed to the base 31 and the casing 32 by using a larger number of screw holes (and screws), and may be fastened with the base 31 and the casing 32 by using methods other than screw holes (and screws).

Here, in the present embodiment, a configuration in which the base 31 and the casing 32 are fixed with the screws 46 via the cover plate 41 is described, but any attachment configuration of the base 31 and the casing 32 may be used.

In the present embodiment, a configuration in which the base 31 and the casing 32 are attachable and detachable as a result of attaching and detaching the cover plate 41 is described, but, as another configuration, a configuration in which the base 31 and the casing 32 are integrally formed not to be detached from each other may be used.

In the present embodiment, the base 31 and the casing 32 are configured separately from each other. In a case where the base 31 and the casing 32 are made of the same material, the base 31 and the casing 32 may look like a constituent element having an integral shape (a constituent element having a shape obtained by combining the base 31 and the casing 32 with each other).

Here, if the base 31 and the casing 32 are configured separately from each other, for example, maintenance of each thereof can be improved, and a variation can be freely given to a combination of the base 31 and the casing 32. For example, in a case where a failure occurs in one of the base 31 and the casing 32, both of the two components are not required to be replaced, and the component in which the failure occurs may be replaced.

Brief of First Arm

The first arm 33 has a substantially rectangular parallelepiped shape (or may have a substantially cubic shape, or a rectangular parallelepiped shape or a cubic shape), and is attached to the base 31 so as to be rotationally moved (rotated) about a rotation shaft (in the illustrated example, a central shaft which is parallel to the direction of the Z axis) in the direction which is perpendicular to two substantially rectangular surfaces facing each other in the rectangular parallelepiped. In the present embodiment, one short side (in the illustrated example, a portion (a part of the first arm 33) including one short side (in the illustrated example, a short side located in the negative direction of the Y axis) of the substantially rectangular surface of the first arm 33 is disposed to be interposed between the surface (the surface D5 other than the protruding portion) of the base 31 on which the protruding portion is present and the surface of the casing 32 facing the surface D5. For example, the surfaces D4 and D5 define a notch 36 in which the first arm 33 is disposed. The rotation shaft is provided in the interposed portion. In other words, the base 31 and the casing 32 have mutually overlapping portions when viewed from a shaft direction of the rotation shaft. The first arm 33 is separated from the surface of the casing 32.

Here, in the present embodiment, a shape in which the substantially rectangular surface has a thickness is used as the substantially rectangular parallelepiped shape of the first arm 33, and a shape in which roundness (curvature) is provided to the two short sides of the rectangle is used as the substantially rectangular shape.

Brief of Second Arm

The second arm 34 has a polyhedral shape, and has a shape similar to the casing 32 in the present embodiment. One (in the illustrated example, a surface G2 located in the negative direction of the Y axis) of two rectangular (or square) surfaces which are not in contact with an oblique surface G1 of the second arm 34 and one (in the illustrated example, the surface B) of the two rectangular (or square) surfaces which are not in contact with the oblique surface E3 of the casing 32 are disposed to oppose each other.

The second arm 34 is attached to the first arm 33 so as to be rotationally moved (rotated) about a rotation shaft (in the illustrated example, a central shaft which is parallel to the direction of the Z axis) in the direction which is perpendicular to the other (in the illustrated example, a surface G3 located in the negative direction of the Z axis) of the two rectangular surfaces which are not in contact with the oblique surface G1. In the present embodiment, a part (a part of the first arm 33) near the other short side (in the illustrated example, a short side located in the positive direction of the Y axis) of the substantially rectangular surface of the first arm 33 and a part of the other (surface G3) of the two rectangular surfaces which are not in contact with the oblique surface G1 of the second arm 34 are disposed to overlap each other. The rotation shaft is provided in the overlapping portion. In the present embodiment, the casing 32 and the second arm 34 are disposed on the same side (in the illustrated example, on the positive direction side of the Z axis) with respect to the substantially rectangular surface of the first arm 33.

The second arm 34 has a hole portion on a surface (in the illustrated example, a surface G4 located in the positive direction of the Z axis and of a portion other than the oblique surface G1) opposing a surface (in the illustrated example, the surface located in the negative direction of the Z axis) facing the first arm 33. In the illustrated example, the surface G4 is parallel to the XY plane. The pipe 51 is accommodated in the hole portion. The hole portion may have the same diameter as that of the hole portion 211 of the casing 32, for example, in a case where a diameter of the pipe 51 is constant.

Brief of Operation Unit

The operation unit 35 has an approximately bar shape (for example, a shape similar to a syringe or a pen). The operation unit 35 is provided on the surface (in the illustrated example, one or both of the oblique surface G1 and the surface G4 of a portion other than the oblique surface G1, located in the positive direction of the Y axis) opposing a surface (in the illustrated example, the surface G2 located in the negative direction of the Y axis) facing the casing 32 in the second arm 34. The operation unit 35 is disposed so that a direction of the bar shape is the same as a direction of the rotation shaft during rotational movement of the first arm 33 and a direction of the rotation shaft during rotational movement of the second arm 34 (in the illustrated example, a direction which is parallel to the Z axis). The operation unit 35 is configured to be movable (linearly movable) along the direction.

The operation unit 35 is provided with a processing mechanism unit (not illustrated) which processes the target object 12 at an end on the first arm 33 and base 31 sides (in the illustrated example, on the negative direction side of the Z axis) of both ends of the bar shape. The processing mechanism unit is a suction mechanism unit which sucks the target object 12 in the present embodiment, but may be other mechanism units. The processing mechanism unit may be provided at an opposite end (in the illustrated example, on the positive direction side of the Z axis) of both ends of the bar shape.

The operation unit 35 may be provided with, for example, a mechanism unit which can be rotationally moved (rotated) about a rotation shaft (in the illustrated example, a central shaft which is parallel to the direction of the Z axis) along the bar shape.

Brief of Pipe

The pipe 51 has a tubular shape, and is a tube having a hollow and elongated shape. The pipe 51 has portions (connection portions) for connection to connection targets at both ends. The pipe 51 can accommodate wirings such as signal lines therein (the hollow portion). In the present embodiment, wirings such as signal lines for connecting the casing 32 and the second arm 34 to each other are accommodated in the pipe 51.

Here, in the present embodiment, the pipe 51 is used as an example of a member (protection member) protecting the wirings such as signal lines.

As the protection member, members other than the pipe 51 may be used.

Brief of Control System of Horizontally Articulated Robot

FIG. 5 is a diagram illustrating a schematic configuration example of a control system of the horizontally articulated robot 11 according to the embodiment of the invention. FIG. 5 illustrates an internal configuration example of the horizontally articulated robot 11 and an external power source 411.

The horizontally articulated robot 11 includes a control device 421 and three motors 471-1 to 471-3. FIG. 5 also illustrates the first arm 33, the second arm 34, and the operation unit 35. In the example illustrated in FIG. 5, a configuration in a case where the operation unit 35 can be rotationally moved is not illustrated.

The control device 421 includes a drive power source board 431 and a power conversion board 432 forming a power source board 430, a control board 433, an inter-board connection portion 434, three motor control boards 451-1 to 451-3, three encoders 452-1 to 452-3, and three amplification units 453-1 to 453-3. The connection portion 434 is connected to the drive power source board 431 and the control board 433.

Here, the motor control board 451-1, the encoder 452-1, the amplification unit 453-1, and the motor 471-1 operate the first arm 33. Here, the motor control board 451-2, the encoder 452-2, the amplification unit 453-2, and the motor 471-2 operate the second arm 34. Here, the motor control board 451-3, the encoder 452-3, the amplification unit 453-3, and the motor 471-3 operate the operation unit 35.

The example illustrated in FIG. 5 shows a case where the operation unit 35 is driven by the motor 471-3 so as to perform a linear movement operation, but, for example, in a case where the operation unit 35 is driven so as to perform a rotational movement operation, the horizontally articulated robot 11 includes functional units (in the present embodiment, a motor control board, an encoder, an amplification unit, and a motor) for performing the operation.

The power source 411 supplies AC power. Any power source may be used as the power source 411.

The drive power source board 431 receives power supplied from the power source 411, and outputs a signal (for example, a current signal or a voltage signal) based on the power to the power conversion board 432.

The power conversion board 432 receives the signal output from the drive power source board 431, and converts the signal from an AC signal into a DC signal which is then output to the drive power source board 431. The power conversion board 432 functions as a converter converting an AC signal into a DC signal. The power conversion board 432 may convert a level or the like of a voltage of a signal.

The drive power source board 431 outputs the signal output from the power conversion board 432, to the control board 433 and the three amplification units 453-1 to 453-3, and thus supplies power thereto.

Here, characteristics (for example, voltage levels) of signals supplied to the control board 433 and the three amplification units 453-1 to 453-3 may be different from each other, and, in this case, the power conversion board 432 converts a signal received from the drive power source board 431 into signals suitable for the control board 433 and the three amplification units 453-1 to 453-3, and outputs the signals to the drive power source board 431. The drive power source board 431 outputs the signals.

The control board 433 is provided with a central processing unit (CPU), performs various operations with the power supplied from the drive power source board 431, and outputs signals (control signals) for controlling the three respective motors 471-1 to 471-3 to the motor control boards 451-1 to 451-3.

In the example illustrated in FIG. 5, the control signals are collectively output from the control board 433, and are sent to the respective motor control boards 451-1 to 451-3 via a common signal line which is connected in series to the motor control board 451-1, the motor control board 451-2, and the motor control board 451-3 in this order. As another configuration example, the control signals may be sent to the motor control boards 451-1 to 451-3 via different signal lines (parallel signal lines).

The amplification units 453-1 to 453-3 respectively include drive circuits for driving the motors 471-1 to 471-3, perform various operations with the power supplied from the drive power source board 431, and supplies power to, for example, the motor control boards 451-1 to 451-3.

The motor control boards 451-1 to 451-3 respectively include, for example, CPUs, perform various operations with the power supplied from the amplification units 453-1 to 453-3, and supply power to the encoders 452-1 to 452-3 and the motors 471-1 to 471-3. The respective motor control boards 451-1 to 451-3 output signals (motor drive signals) for driving (controlling) the motors 471-1 to 471-3 to the motors 471-1 to 471-3 on the basis of the control signals sent from the control board 433.

The encoders 452-1 to 452-3 perform operations with the power supplied from the respective motor control boards 451-1 to 451-3, detect rotation situations (for example, a rotation speed) of the motors 471-1 to 471-3, and output information regarding detection results to the motor control boards 451-1 to 451-3.

The respective motors 471-1 to 471-3 perform operations with the power supplied from the motor control boards 451-1 to 451-3, receive the signals output from the motor control boards 451-1 to 451-3, and are driven on the basis of the signals so as to operate respective targets (the first arm 33, the second arm 34, and the operation unit 35). The power signals and the control signals supplied to the motors 471-1 to 471-3 may be common signals (that is, signals for performing both the supply of power and control).

As mentioned above, the control device 421 controls operations of the first arm 33, the second arm 34, and the operation unit 35. The control device 421 controls various different processes in the horizontally articulated robot 11.

The drive power source board 431 and the power conversion board 432 of the control device 421 supply power to the drive units (in the example illustrated in FIG. 5, the motor control board 451-1, the amplification unit 453-1, and the motor 471-1) driving the first arm 33, the drive units (in the example illustrated in FIG. 5, the motor control board 451-2, the amplification unit 453-2, and the motor 471-2) driving the second arm 34, and the drive units (in the example illustrated in FIG. 5, the motor control board 451-3, the amplification unit 453-3, and the motor 471-3) driving the operation unit 35. The drive units (or some functions thereof) may be referred to as, for example, an actuator.

Here, the example illustrated in FIG. 5 shows a configuration in which the motor control boards 451-1 to 451-3, the encoders 452-1 to 452-3, and the amplification units 453-1 to 453-3 are respectively provided for the motors 471-1 to 471-3, but, as another configuration example, two or three (that is, all) thereof may be integrally formed. As an example, the motor control boards 451-1 to 451-3 and the amplification units 453-1 to 453-3 may be integrally formed for the respective motors 471-1 to 471-3. For example, a configuration in which the encoders 452-1 to 452-3 are not provided may be used.

The example illustrated in FIG. 5 shows a case where the motors 471-1 to 471-3 are not included in the control device 421, and, as another configuration example, the motors 471-1 to 471-3 may be included in the control device 421. The example illustrated in FIG. 5 shows a configuration in which the encoders 452-1 to 452-3 are included in the control device 421, but, as another configuration example, the encoders 452-1 to 452-3 may not be included in the control device 421. The control device 421 may have other configurations.

Regarding the respective motors 471-1 to 471-3, for example, a configuration in which portions (portions of the motors 471-1 to 471-3 and the motor control boards 451-1 to 451-3) other than the amplification units related to the motors and portions of the amplification units (portions of the amplification units 453-1 to 453-3) are integrally formed may be used, and a configuration in which such portions are separately formed may be used. In a case where such portions are integrally formed, for example, portions of the encoders (portions of the encoders 452-1 to 452-3) may be further integrally formed. Here, in the configuration in which the portions other than the amplification units related to the motors and the portions of the amplification units are integrally formed, wirings for connecting the portions to each other can be shortened, and miniaturization can be achieved.

The example illustrated in FIG. 5 shows a case where the three motor control boards 451-1 to 451-3 are separately formed, but, as another configuration example, two or more thereof may be integrally formed (two or more thereof may be formed of a common board).

As each of the motors 471-1 to 471-3, an AC motor may be used, or a DC motor may be used.

Brief of Arrangement of Boards in Horizontally Articulated Robot

Figure 6:
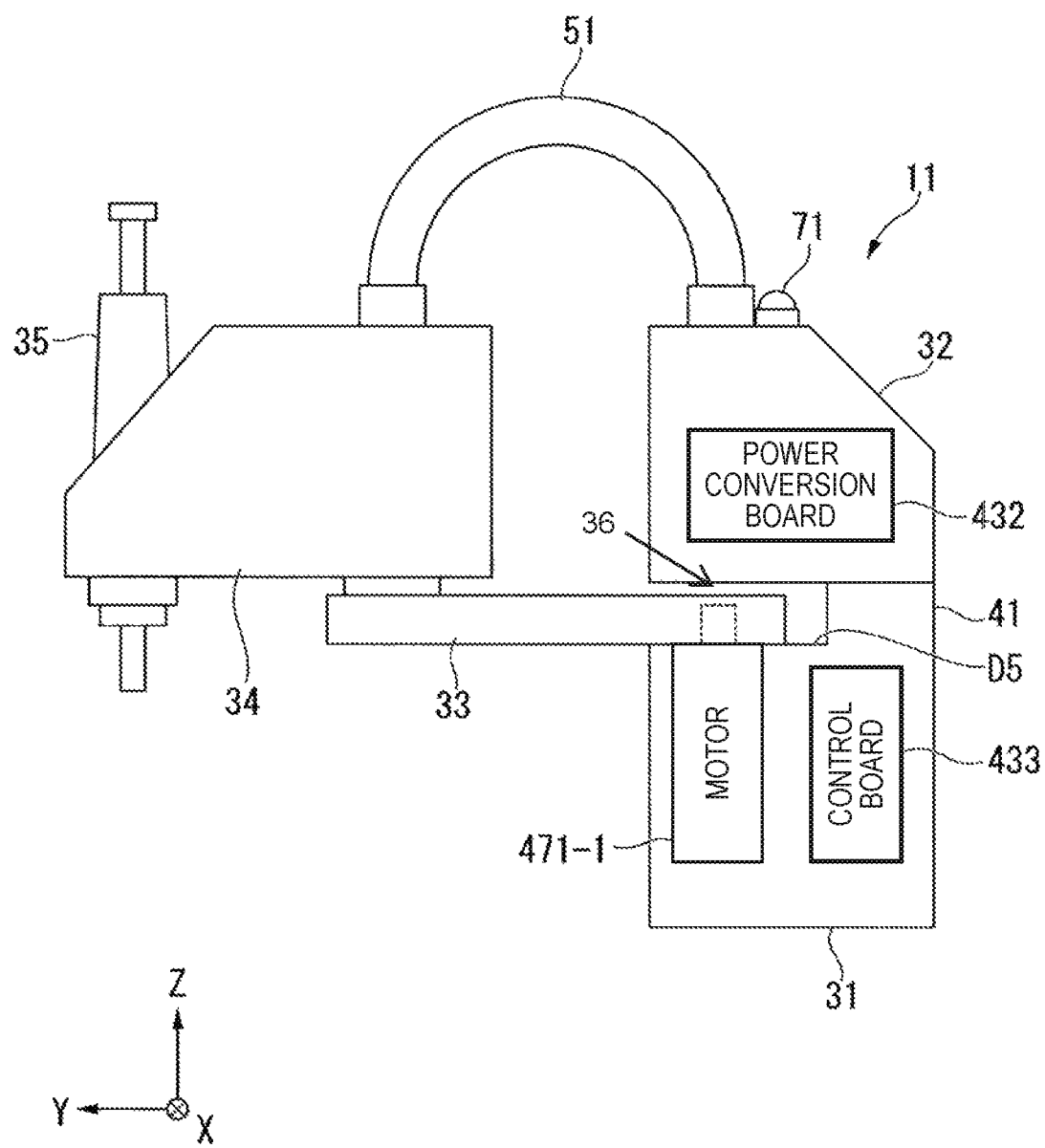
FIG. 6 is a diagram illustrating a schematic configuration example of arrangement of boards in the horizontally articulated robot according to the embodiment of the invention.

FIG. 6 is a diagram illustrating a schematic configuration example of arrangement of boards in the horizontally articulated robot 11 according to the embodiment of the invention.

For convenience of description, FIG. 6 illustrates an XYZ coordinate system which is the same three-dimensional orthogonal coordinate system as illustrated in FIG. 1. FIG. 6 illustrates the horizontally articulated robot 11 in a direction matching arrangement of the horizontally articulated robot 11 illustrated in FIG. 1.

FIG. 6 is a view in which the horizontally articulated robot 11 illustrated in FIG. 1 is viewed in a direction (in the illustrated example, the direction directed from the negative side of the X axis toward the positive side thereof) perpendicular to the surface E1 from the outside of the surface E1 (in the illustrated example, a surface which is parallel to the YZ plane) on which the openings 92 of the casing 32 are provided, and is a schematic view in which the insides of the base 31 and the casing 32 are seen through.

In the example illustrated in FIG. 6, the control board 433 and the motor 471-1 of the first arm 33 are disposed and provided inside the base 31. The power conversion board 432 is disposed and provided inside the casing 32.

Here, in the present embodiment, the respective functional units included in the control device 421 and the three motors 471-1 to 471-3 are provided in the horizontally articulated robot 11. In the example illustrated in FIG. 6, although not illustrated, the control board 433, the motor 471-1, and the power conversion board 432 may be provided at any locations where the constituent elements can be disposed in a configuration in which at least apart of the control device 421 is located inside the base 31.

For example, the drive power source board 431 may be disposed and provided inside the base 31, and may be disposed and provided inside the casing 32.

For example, the motor control board 451-1, the encoder 452-1, and the amplification unit 453-1 related to the first arm 33 may be disposed and provided near the first arm 33 in the base 31 in the same manner as in the motor 471-1.

For example, the motor control board 451-2, the encoder 452-2, the amplification unit 453-2 and the motor 471-2 related to the second arm 34 may be disposed and provided inside the second arm 34.

For example, the motor control board 451-3, the encoder 452-3, the amplification unit 453-3, and the motor 471-3 related to the operation unit 35 may be disposed and provided near the operation unit 35 in the second arm 34.

As mentioned above, in the horizontally articulated robot 11 according to the present embodiment, at least a part of the control device 421 controlling the first arm 33 provided on the base 31 is located inside the base 31. Consequently, in the horizontally articulated robot 11, it is possible to reduce a footprint. Specifically, in a case where horizontally articulated robots having the same extent of size are manufactured according to the related art and the present embodiment, whereas the horizontally articulated robot (main body) and a control device are configured separately from each other in the related art, at least a part of the control device 421 is located inside the base 31 of the horizontally articulated robot 11 in the present embodiment. Thus, it is possible to reduce a footprint compared with the horizontally articulated robot of the related art.

In the present embodiment, the control device 421 is built into and integrated with the horizontally articulated robot 11. In the example illustrated in FIG. 5, the constituent elements of the control device 421 are provided inside the base 31, the casing 32, the first arm 33, or the second arm 34. In the present embodiment, since the casing 32 is provided, a space in which the constituent elements or the like of the control device 421 can be accommodated is generated inside the casing 32, and thus the space is used.

Consequently, in the present embodiment, it is possible to miniaturize the horizontally articulated robot 11 and thus to increase safety (for example, to minimize the influence exerted on the external world).

In the present embodiment, in the horizontally articulated robot 11, for example, in a case where an opposite surface to the surface D5 of the base 31 facing the casing 32 is provided on an installation target (for example, a floor or a ceiling), a footprint can be reduced, and a degree of freedom of layout of a manipulator (in the present embodiment, the portions of the first arm 33, the second arm 34, and the operation unit 35) and peripheral devices can be increased.

In the present embodiment, for example, a location where the control device 421 is installed may not be designed.

In the present embodiment, for example, a configuration of suppressing an increase in a footprint of the base 31 is provided, and thus it is possible to use a region of an installation target (for example, a floor or a ceiling) with high efficiency in terms of footprint compared with a configuration of just increasing a footprint of the base and accommodating the portions of the control device therein.

In the present embodiment, for example, since the constituent elements of the control device 421 are accommodated inside the horizontally articulated robot 11 (the inside of the base 31, the inside of the casing 32, the inside of the first arm 33, or the inside of the second arm 34), it is possible to easily design paths of wirings (power source lines and control lines) for the control device 421 operating the first arm 33, the second arm 34, and the operation unit 35.

In the present embodiment, in the horizontally articulated robot 11, a component (in the example illustrated in FIG. 6, the power conversion board 432) having a large amount of generated heat among the components forming the control device 421 and a component (in the example illustrated in FIG. 6, the motor 471-1 of the first arm 33) having a large amount of generated heat except for the control device 421 are disposed in different constituent elements (the casing 32 and the base 31 in the present embodiment). Consequently, it is possible to prevent an increase in temperature in the base 31 and the casing 32. As mentioned above, among the components forming the control device 421, the power conversion board 432 which is a component weak to heat (for example, a component weakest to heat) is isolated so as to undergo intensive heat care, and thus it is possible to reduce (preferably, minimize) a function deterioration due to heat restriction being required to be performed.

Here, in the present embodiment, a description has been made of a case where the drive power source board 431 and the power conversion board 432 are provided separately from each other, but, as another configuration example, a board (power source board 430) into which the drive power source board 431 and the power conversion board 432 are integrated may be provided. In this case, for example, the board into which the drive power source board 431 and the power conversion board 432 are integrated may be handled as a component having a large amount of generated heat (a component weak to heat).

As still another configuration example, in a configuration in which at least a part of the control device 421 is located inside the base 31, the motor control board 451-2 related to the second arm 34 may be disposed to be separated from the second arm 34, and may be disposed and provided inside the base 31 or inside the casing 32, for example.

Similarly, as still another configuration example, in a configuration in which at least a part of the control device 421 is located inside the base 31, the motor control board 451-3 related to the operation unit 35 may be disposed to be separated from the operation unit 35, and may be disposed and provided inside the base 31 or inside the casing 32, for example.

As still another configuration example, also with respect to the power conversion board 432 and the control board 433 illustrated in FIG. 6, in a configuration in which at least a part of the control device 421 is located inside the base 31, other arrangements may be used, and, for example, the power conversion board 432 may be disposed and provided inside the base 31, the control board 433 may be disposed and provided inside the casing 32, and both of the power conversion board 432 and the control board 433 may be provided inside the base 31 or the casing 32.

In the present embodiment, it may be preferable that the power conversion board 432 and the motor 471-1 are accommodated not in the same constituent element (for example, either one of the base 31 and the casing 32) but in different constituent elements, but a configuration in which the power conversion board 432 and the motor 471-1 are accommodated in the same constituent element may be used.

For example, in the present embodiment, a description has been made of a configuration example in which sizes of the respective boards (the drive power source board 431, the power conversion board 432, the control board 433, and the motor control boards 451-1 to 451-3) included in the control device 421 are taken into consideration, but, as another configuration example, a configuration may be used in which all of the boards included in the control device 421 are integrally formed and are provided inside the casing 32.

Brief of Arrangement of Pipe in Horizontally Articulated Robot 11

Figure 7:
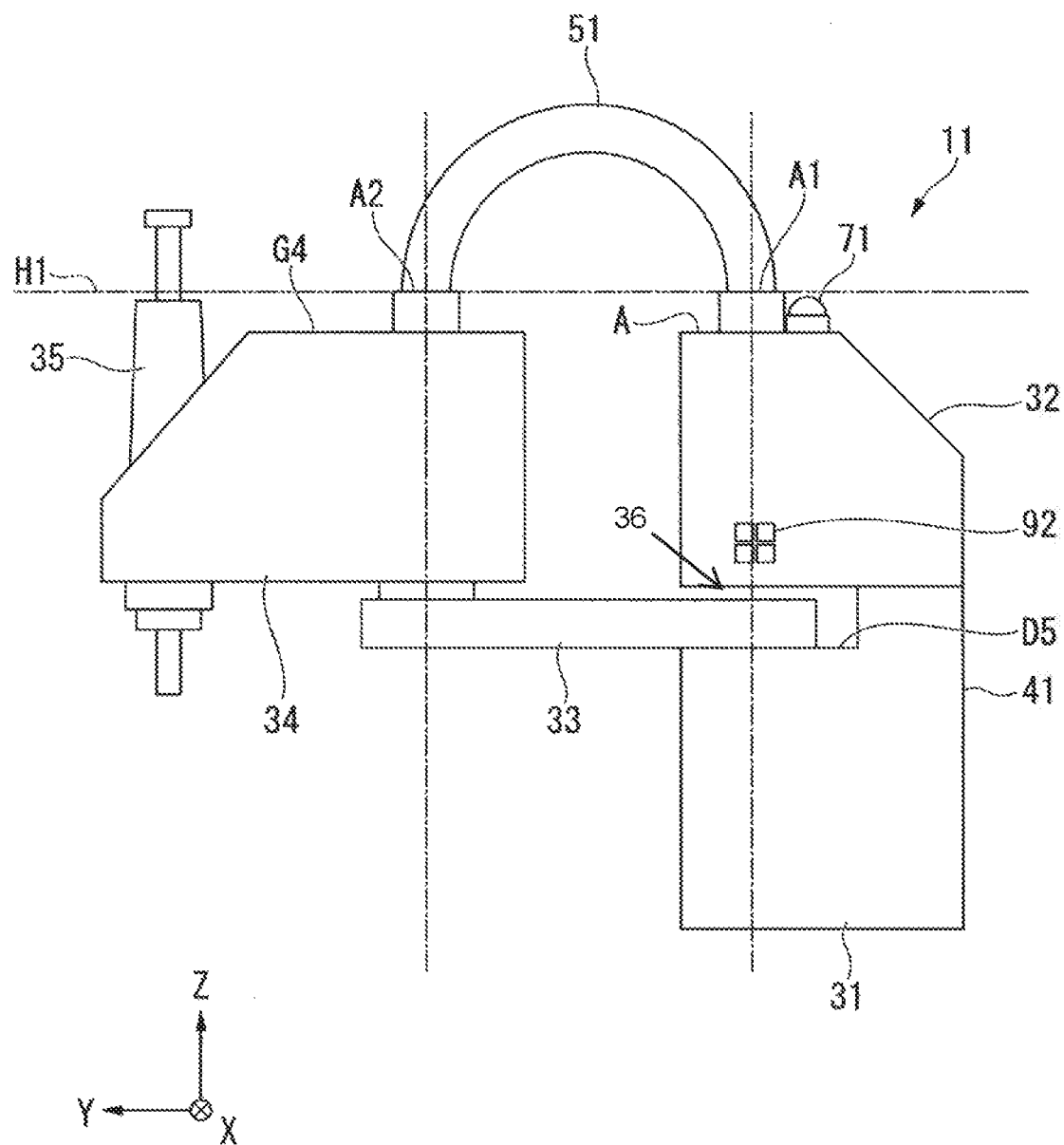
FIG. 7 is a diagram illustrating a schematic configuration example of arrangement of a pipe in the horizontally articulated robot according to the embodiment of the invention.

FIG. 7 is a diagram illustrating a schematic configuration example of arrangement of the pipe 51 in the horizontally articulated robot 11 according to the embodiment of the invention.

For convenience of description, FIG. 7 illustrates an XYZ coordinate system which is the same three-dimensional orthogonal coordinate system as illustrated in FIG. 1. FIG. 7 illustrates the horizontally articulated robot 11 in a direction matching arrangement of the horizontally articulated robot 11 illustrated in FIG. 1.

FIG. 7 is a schematic exterior view in which the horizontally articulated robot 11 illustrated in FIG. 1 is viewed in a direction (in the illustrated example, the direction directed from the negative side of the X axis toward the positive side thereof) perpendicular to the surface from the outside of the surface (in the illustrated example, the surface E1 which is parallel to the YZ plane) on which the openings 92 of the casing 32 are provided.

In the present embodiment, the surface (in the illustrated example, a surface located in the negative direction of the Z axis) facing the surface D5 of the base 31 on which the casing 32 is provided, the surface A of the casing 32 connected to the pipe 51, and the surface (in the illustrated example, the surface G4 located in the positive direction of the Z axis) of the second arm 34 connected to the pipe 51 are parallel to each other (in the illustrated example, parallel to the XY plane). A vertical distance (in the illustrated example, a distance in the direction of the Z axis) between the surface D5 of the base 31 on which the casing 32 is provided and the surface facing the surface D5 is the same as in the surface A of the casing 32 connected to the pipe 51, and the surface G4 of the second arm 34 connected to the pipe 51.

In the illustrated example, a line (hereinafter, referred to as a "reference line") H1 connecting a location (connection position A1) at which one end connection portion of the pipe 51 is connected to the casing 32 to a location (connection position A2) at which the other end connection portion of the pipe 51 is connected to the second arm 34 is parallel to (in the illustrated example, parallel to the XY plane) the surface facing the surface D5 of the base 31 on which the casing 32 is provided. In other words, the connection position A1 and the connection position A2 are the same position in the shaft direction of the rotation shaft of the first arm 33.

In the illustrated example, the reference line H1 extends up to portions other than the connection portions at both ends of the pipe 51, but, in the present embodiment, the connection portions at both ends of the pipe 51 have the same configuration, and the reference line H1 is parallel to the XY plane even in a case where the connection portions are not excluded (that is, the connection portions are included).

As mentioned above, in the present embodiment, one end of the pipe 51 is attached to the surface A of the casing 32 at the position of the rotation shaft of the first arm 33, and the other end of the pipe 51 is attached to the surface G4 of the second arm 34 located on the same plane (a plane wider than a plane including the surface A) as the surface A at the position of the rotation shaft of the second arm 34. The surfaces A and G4 are perpendicular to the rotation shaft of the first arm 33 and the rotation shaft of the second arm 34.

Consequently, one end and the other end of the pipe 51 are in a state of being attached to the same plane. Therefore, stress applied to the pipe 51 can be reduced, and thus a swing of the pipe 51 is reduced, compared with a case where one end and the other end of the pipe 51 are attached to two surfaces (in the illustrated example, surfaces deviated in the direction of the rotation shaft) which are not included in the same plane. Thus, the risk of disconnection of wirings accommodated in the pipe 51 is reduced. In a case where wirings are accommodated in the pipe 51, the risk of disconnection of the wirings is reduced, for example, compared with a case of pulling around wirings outside without using a pipe.

MODIFICATION EXAMPLE (FIRST MODIFICATION EXAMPLE) OF HORIZONTALLY ARTICULATED ROBOT

Figure 8:
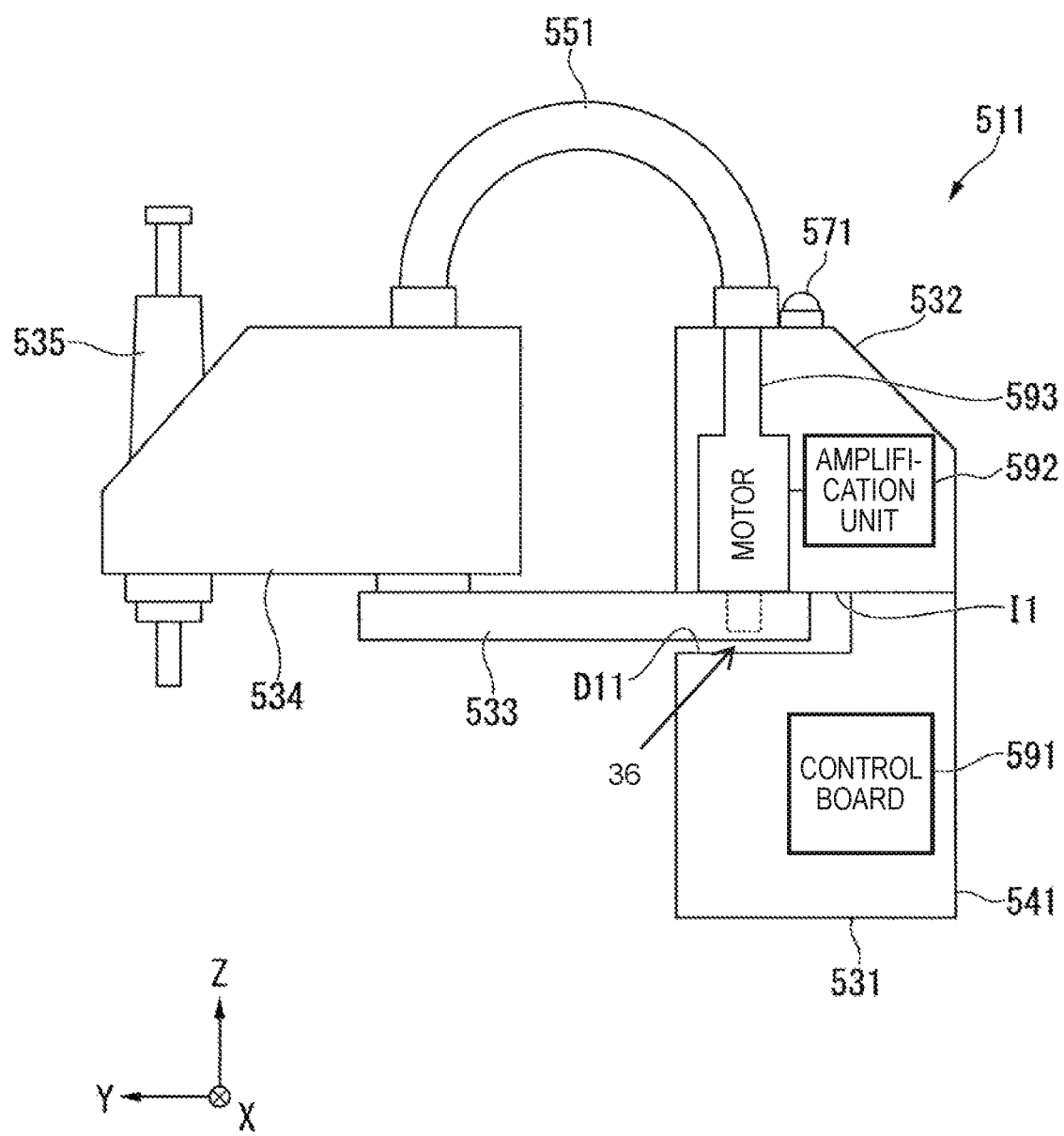
FIG. 8 is a diagram illustrating a schematic configuration example of a modification example (first modification example) of a horizontally articulated robot according to the embodiment of the invention.

FIG. 8 is a diagram illustrating a schematic configuration example of a modification example (first modification example) of a horizontally articulated robot 511 according to the embodiment of the invention.

For convenience of description, FIG. 8 illustrates an XYZ coordinate system which is the same three-dimensional orthogonal coordinate system as illustrated in FIG. 1. FIG. 8 illustrates the horizontally articulated robot 511 related to the modification example in a direction matching arrangement of the horizontally articulated robot 11 illustrated in FIG. 1.

FIG. 8 illustrates an outline of the horizontally articulated robot 511, and illustrates, specifically, a base 531, a casing 532, an arm (hereinafter, also referred to as a "first arm") 533, an arm (hereinafter, also referred to as a "second arm") 534, an operation unit 535, a cover plate 541, a pipe 551, and a lamp 571.

FIG. 8 illustrates a control board 591, and an amplification unit 592 and a motor 593 related to the first arm 533 as an internal configuration example of the horizontally articulated robot 511.

Here, the horizontally articulated robot 511 according to the modification example illustrated in FIG. 8 is fundamentally the same as the horizontally articulated robot 11 illustrated in FIG. 1 except for an internal configuration and a configuration regarding the first arm 533.

Herein, with respect to the horizontally articulated robot 511 according to the modification example illustrated in FIG. 8, constituent portions which are different from those of the horizontally articulated robot 11 illustrated in FIG. 1 will be focused.

FIG. 8 is a view in which the horizontally articulated robot 511 is viewed from the outside of a surface (in the illustrated example, a surface which is parallel to the YZ plane) on which openings (corresponding to the openings 92 illustrated in FIG. 1) of the casing 532 are provided in a direction (in the illustrated example, a direction directed from the negative side of the X axis toward the positive side thereof) perpendicular to the surface, and is a schematic view in which the insides of the base 531 and the casing 532 are seen through.

In the example illustrated in FIG. 8, the first arm 533 has a substantially rectangular parallelepiped shape (or may have a substantially cubic shape, or a rectangular parallelepiped shape or a cubic shape), and is attached to the casing 532 so as to be rotationally moved (rotated) about a rotation shaft (in the illustrated example, a central shaft which is parallel to the direction of the Z axis) in the direction which is perpendicular to two substantially rectangular surfaces facing each other in the rectangular parallelepiped. In the example illustrated in FIG. 8, one short side (in the illustrated example, a portion (a part of the first arm 533)) including one short side (in the illustrated example, a short side located in the negative direction of the Y axis) of the substantially rectangular surface of the first arm 533 is disposed to be interposed between a surface D11 (a surface other than a protruding portion) of the base 531 on which the protruding portion is present and a surface I1 of the casing 532 facing the surface D11. The rotation shaft is provided in the interposed portion. In other words, the base 531 and the casing 532 have mutually overlapping portions when viewed from a shaft direction of the rotation shaft. The first arm 533 is separated from the surface D11 of the base 531.

Here, in the example illustrated in FIG. 8, a shape in which the substantially rectangular surface has a thickness is used as the substantially rectangular parallelepiped shape of the first arm 533, and a shape in which roundness (curvature) is provided to the two short sides of the rectangle is used as the substantially rectangular shape.

As mentioned above, whereas the first arm 33 is attached to the base 31 in the example illustrated in FIG. 1, the first arm 533 is attached to the casing 532 in the example illustrated in FIG. 8. In the example illustrated in FIG. 8, the base 531 is a constituent element which indirectly supports the first arm 533 via the casing 532.

In the example illustrated in FIG. 8, the control board 591 is disposed and provided inside the base 531. The amplification unit 592 and the motor 593 related to the first arm 533 are disposed and provided inside the casing 532.

Here, in the present embodiment, the respective functional units included in a control device (corresponding to the control device 421 illustrated in FIG. 5) and three motors (corresponding to the three motors 471-1 to 471-3 illustrated in FIG. 5) are provided in the horizontally articulated robot 511. In contrast, in the example illustrated in FIG. 8, although not illustrated, the control board 591 (corresponding to the control board 433 illustrated in FIG. 5), and the amplification unit 592 (corresponding to the amplification unit 453-1 illustrated in FIG. 5) and the motor 593 (corresponding to the motor 471-1 illustrated in FIG. 5) related to the first arm 533 may be provided at any locations where the constituent elements can be disposed in a configuration in which at least a part of the control device is located inside the base 531. For example, in the example illustrated in FIG. 8, a power conversion board (corresponding to the power conversion board 432 illustrated in FIG. 5) may be provided inside the base 531.

As another configuration example, the control board 591, and the amplification unit 592 and the motor 593 related to the first arm 533, illustrated in FIG. 8, may also be provided at any locations where the constituent elements can be disposed in a configuration in which at least a part of the control device is located inside the base 531.

Here, in the example illustrated in FIG. 8, the control board 591 is accommodated in the base 531, and the amplification unit 592 and the motor 593 related to the first arm 533 are accommodated in the casing 532. The first arm 533 is supported by the casing 532, and the pipe 551 is connected to the casing 532 (at a position near the amplification unit 592 and the motor 593 related to the first arm 533 in the example illustrated in FIG. 8).

In this configuration, constituent elements (the control board 591, the drive power source board, and the power conversion board) which are bases regarding control or the supply of power, constituent elements (the amplification unit 592, the motor 593, a motor control board, and an encoder) regarding driving of the first arm 533, the pipe 551, constituent elements (an amplification unit, a motor, a motor control board, and an encoder) regarding driving of the second arm 534, and constituent elements (an amplification unit, a motor, a motor control board, and an encoder) regarding driving of the operation unit 535 can be disposed in one direction (which here indicates that going forward or backward does not occur in the middle). Through this arrangement, for example, with respect to the constituent elements, the entire flow of wirings can be directed in one direction, and thus the entire flow of wirings can be made smooth. In this configuration, for example, wirings are configured to flow in order of the constituent elements which are bases regarding control or the supply of power, the constituent elements regarding driving of the first arm 533, the constituent elements regarding driving of the second arm 534, and the constituent elements regarding driving of the operation unit 535. The flow of the wirings in one direction may be flows connected in a row.

Wirings toward the constituent elements regarding driving of the second arm 534 and the constituent elements regarding driving of the operation unit 535 flow through the pipe 551. The constituent elements regarding driving of the second arm 534 are disposed inside, for example, the second arm 534, and are disposed near the rotation shaft of the second arm 534. The constituent elements regarding driving of the operation unit 535 may be disposed near the operation unit 535, and may be disposed inside the second arm 534.

MODIFICATION EXAMPLE (SECOND MODIFICATION EXAMPLE) OF HORIZONTALLY ARTICULATED ROBOT

Figure 9:
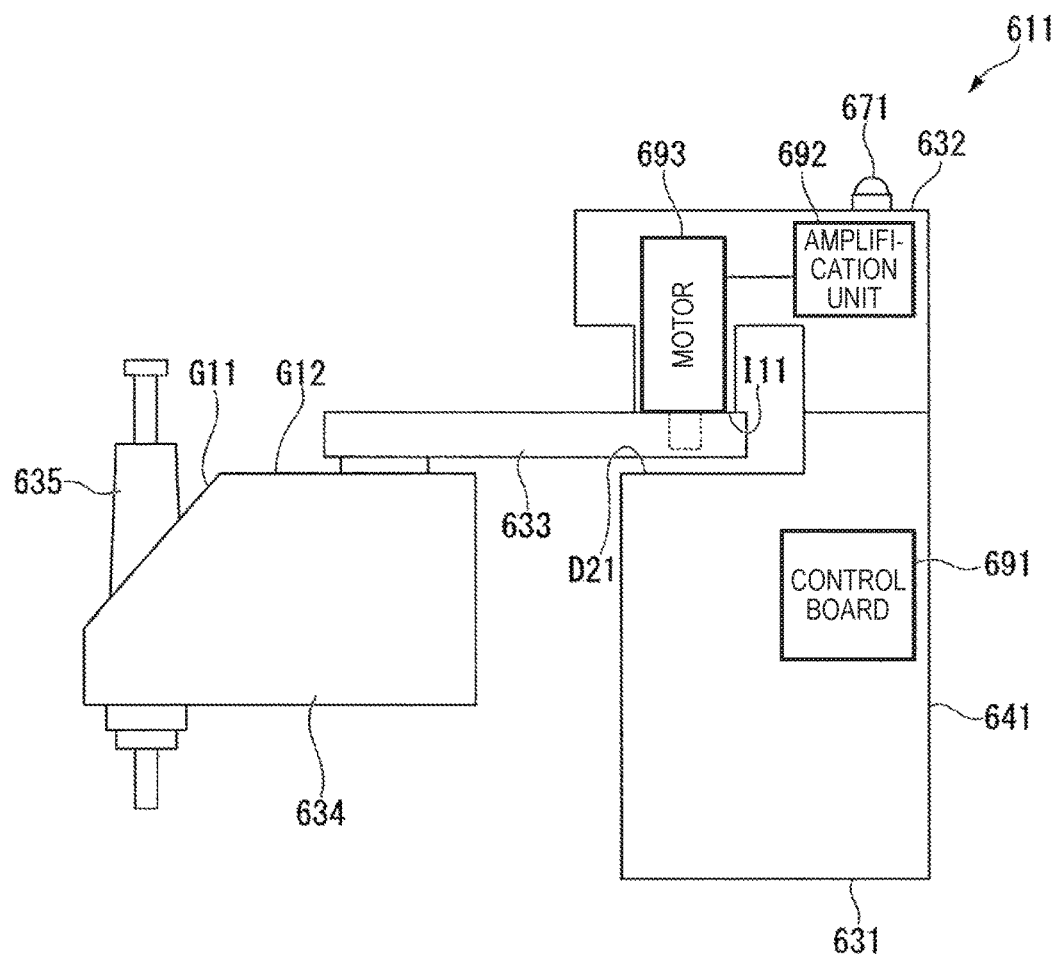
FIG. 9 is a diagram illustrating a schematic configuration example of a modification example (second modification example) of a horizontally articulated robot according to the embodiment of the invention.

FIG. 9 is a diagram illustrating a schematic configuration example of a modification example (second modification example) of a horizontally articulated robot 611 according to the embodiment of the invention.

For convenience of description, FIG. 9 illustrates an XYZ coordinate system which is the same three-dimensional orthogonal coordinate system as illustrated in FIG. 1. FIG. 9 illustrates the horizontally articulated robot 611 related to the modification example in a direction matching arrangement of the horizontally articulated robot 11 illustrated in FIG. 1.

FIG. 9 illustrates an outline of the horizontally articulated robot 611, and illustrates, specifically, a base 631, a casing 632, an arm (hereinafter, also referred to as a "first arm") 633, an arm (hereinafter, also referred to as a "second arm") 634, an operation unit 635, a cover plate 641, and a lamp 671.

FIG. 9 illustrates a control board 691, and an amplification unit 692 and a motor 693 related to the first arm 633 as an internal configuration example of the horizontally articulated robot 611.

Here, the horizontally articulated robot 611 according to the modification example illustrated in FIG. 9 is fundamentally the same as the horizontally articulated robot 11 illustrated in FIG. 1 except for an internal configuration, shapes of the base 631 and the casing 632, and a configuration regarding the first arm 633 and the second arm 634, and the pipe 51 illustrated in FIG. 1 is not provided.

Herein, with respect to the horizontally articulated robot 611 according to the modification example illustrated in FIG. 9, constituent portions which are different from those of the horizontally articulated robot 11 illustrated in FIG. 1 will be focused.

FIG. 9 is a view in which the horizontally articulated robot 611 is viewed from the outside of a surface (in the illustrated example, a surface which is parallel to the YZ plane) on which openings (the openings 92 illustrated in FIG. 1) of the casing 632 are provided in a direction (in the illustrated example, a direction directed from the negative side of the X axis toward the positive side thereof) perpendicular to the surface, and is a schematic view in which the insides of the base 631 and the casing 632 are seen through.

In the example illustrated in FIG. 9, the first arm 633 has a substantially rectangular parallelepiped shape (or may have a substantially cubic shape, or a rectangular parallelepiped shape or a cubic shape), and is attached to the casing 632 so as to be rotationally moved (rotated) about a rotation shaft (in the illustrated example, a central shaft which is parallel to the direction of the Z axis) in the direction which is perpendicular to two substantially rectangular surfaces facing each other in the rectangular parallelepiped. In the example illustrated in FIG. 9, one short side (in the illustrated example, a portion (a part of the first arm 633) including one short side (in the illustrated example, a short side located in the negative direction of the Y axis) of the substantially rectangular surface of the first arm 633 is disposed to be interposed between a surface D21 (a surface other than a protruding portion) of the base 631 on which the protruding portion is present and a surface I11 of the casing 632 facing the surface D21. The rotation shaft is provided in the interposed portion. In other words, the base 631 and the casing 632 have mutually overlapping portions when viewed from a shaft direction of the rotation shaft. The first arm 633 is separated from the surface D21 of the base 631.

Here, in the example illustrated in FIG. 9, a shape in which the substantially rectangular surface has a thickness is used as the substantially rectangular parallelepiped shape of the first arm 633, and a shape in which roundness (curvature) is provided to the two short sides of the rectangle is used as the substantially rectangular shape.

In the example illustrated in FIG. 9, the second arm 634 is attached to the first arm 633 on the direction side (in the illustrated example, the negative direction of the Z axis) in which the base 631 is present, so as to be rotationally moved (rotated). In the example illustrated in FIG. 9, of two rectangular (or square) surfaces in contact with an oblique surface G11 in the second arm 634, the surface (in the illustrated example, a surface G12 located in the positive direction of the Z axis) perpendicular to a linear movement direction (in the illustrated example, the direction of the Z axis) of the operation unit 635 is attached to the first arm 633.

As mentioned above, whereas the first arm 33 is attached to the base 31 in the example illustrated in FIG. 1, the first arm 633 is attached to the casing 632 in the example illustrated in FIG. 9. In the example illustrated in FIG. 9, the base 631 is a constituent element which indirectly supports the first arm 633 via the casing 632.

Compared with the example illustrated in FIG. 1, in the example illustrated in FIG. 9, the surface of the first arm 633 to which the second arm 634 is attached is an opposite surface. Compared with the example illustrated in FIG. 1, in the example illustrated in FIG. 9, the surface G12 of the second arm 634 attached to the first arm 633 is an opposite surface.

In the example illustrated in FIG. 9, the control board 691 is disposed and provided inside the base 631. The amplification unit 692 and the motor 693 related to the first arm 633 are disposed and provided inside the casing 632 (in the illustrated example, a part of the motor 693 is disposed inside the casing 632).

Here, in the present embodiment, the respective functional units included in a control device (corresponding to the control device 421 illustrated in FIG. 5) and three motors (corresponding to the three motors 471-1 to 471-3 illustrated in FIG. 5) are provided in the horizontally articulated robot 611. In contrast, in the example illustrated in FIG. 9, although not illustrated, the control board 691 (corresponding to the control board 433 illustrated in FIG. 5), and the amplification unit 692 (corresponding to the amplification unit 453-1 illustrated in FIG. 5) and the motor 693 (corresponding to the motor 471-1 illustrated in FIG. 5) related to the first arm 633 may be provided at any locations where the constituent elements can be disposed in a configuration in which at least a part of the control device is located inside the base 631.

As another configuration example, the control board 691, and the amplification unit 692 and the motor 693 related to the first arm 633, illustrated in FIG. 9, may also be provided at any locations where the constituent elements can be disposed in a configuration in which at least a part of the control device is located inside the base 631.

Here, in the example illustrated in FIG. 9, the control board 691 is accommodated in the base 631, and the amplification unit 692 and the motor 693 related to the first arm 633 are accommodated in the casing 632. The first arm 633 is supported by the casing 632.

In this configuration, in the same manner as in the example illustrated in FIG. 8, constituent elements which are bases regarding control or the supply of power, constituent elements regarding driving of the first arm 633, constituent elements regarding driving of the second arm 634, and constituent elements regarding driving of the operation unit 635 can be disposed in one direction (which here indicates that going forward or backward does not occur in the middle). Through this arrangement, for example, with respect to the constituent elements, the entire flow of wirings can be directed in one direction, and thus the entire flow of wirings can be made smooth. The flow of the wirings in one direction may be flows connected in a row.

In the example illustrated in FIG. 9, a pipe is not provided, and wirings toward the constituent elements regarding driving of the second arm 634 and the constituent elements regarding driving of the operation unit 635 may flow through, for example, the inside of the first arm 633 or the outside thereof. As another configuration example, a pipe may be provided, and wirings may be accommodated in the pipe.

Brief of Arrangement of Display Portions in Casing of Horizontally Articulated Robot In the present embodiment, the horizontally articulated robot 11 is provided with a display portion used to display a state or the like of the horizontally articulated robot 11. The display portion may be, for example, a light emitting portion emitting light, and may be others. The light emitting portion may be a light emitting diode (LED). For example, the light emitting portion may indicate information with light from a single dot, and may indicate information based on letters or graphics with a set of light beams from a plurality of dots (for example, pixels).

Figure 10:
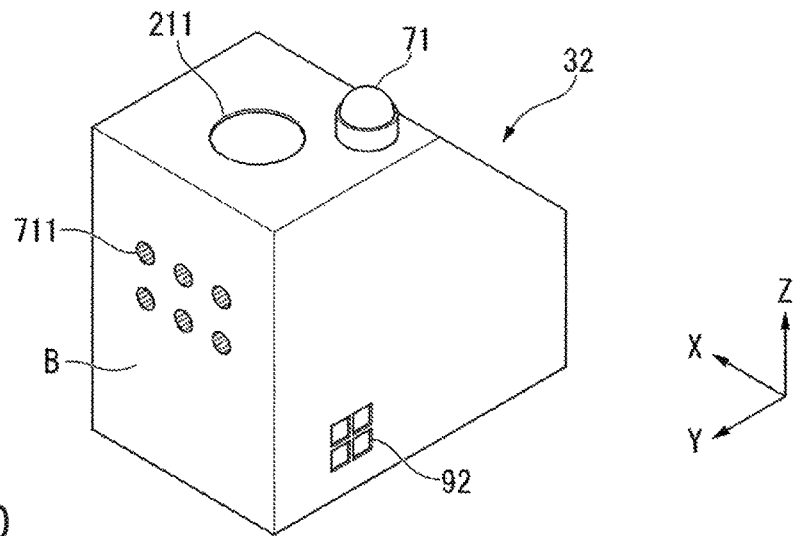
FIG. 10 is a diagram illustrating a schematic configuration example of arrangement of display portions in the casing of the horizontally articulated robot according to the embodiment of the invention.

FIG. 10 is a diagram illustrating a schematic configuration example of arrangement of display portions 711 in the casing 32 of the horizontally articulated robot 11 according to the embodiment of the invention.

For convenience of description, FIG. 10 illustrates an XYZ coordinate system which is the same three-dimensional orthogonal coordinate system as illustrated in FIG. 1. FIG. 10 illustrates the casing 32 in a direction matching arrangement of the horizontally articulated robot 11 illustrated in FIG. 1.

In the present embodiment, the display portions 711 formed of LEDs as light emitting portions are provided on the single surface B among the plurality of surfaces of the casing 32. In the present embodiment, six display portions 711 are provided on the surface B on the second arm 34 side.

In the present embodiment, power is supplied to the display portions 711 by the control device 421 (for example, the drive power source board 431 and the power conversion board 432 related to the supply of power, and the control board 433 related to control) illustrated in FIG. 5, and thus a signal (display control signal) for controlling display (in the present embodiment, light emission) is transmitted to the display portions 711. The display portions 711 receive the display control signal, and perform a display operation (including a case of non-display) on the basis of the display control signal. In this case, for example, the control device 421 and the display portions 711 may be communicably connected to each other in a wired manner, and may be communicably connected to each other in a wireless manner.

The display portions 711 may display any information in relation to a state or the like of the horizontally articulated robot 11. The information may be, for example, information indicating whether or not a failure occurs in a predetermined location in the horizontally articulated robot 11. As an example, there may be the use of a configuration in which the display portions 711 emit predetermined light in a case where a failure occurs in a predetermined location, and the display portions 711 do not emit the predetermined light in a case where the failure does not occur.

In the present embodiment, only one of the six display portions 711 is given the reference numeral. In the present embodiment, the six display portions 711 are disposed at an equal interval in two rows and three columns (any directions of rows and columns may be used) on the surface B, but other arrangements may be used. In the present embodiment, the six display portions 711 are provided, and, for example, the respective display portions 711 (a single display portion 711) may display different pieces of information, and information may be indicated through a combination of two or more display portions 711.

The number of display portions 711 may be any number of one or more.

The display portions 711 may be provided on any surface among the plurality of surfaces of the casing 32.

The display portions 711 may be provided on two or more surfaces among the plurality of surfaces of the casing 32.

In the present embodiment, the display portions 711 are provided on the casing 32, but, as another configuration example, the display portions 711 may be provided at any location in the horizontally articulated robot 11. The display portions 711 may be provided on, for example, the base 31.

Figure 11:
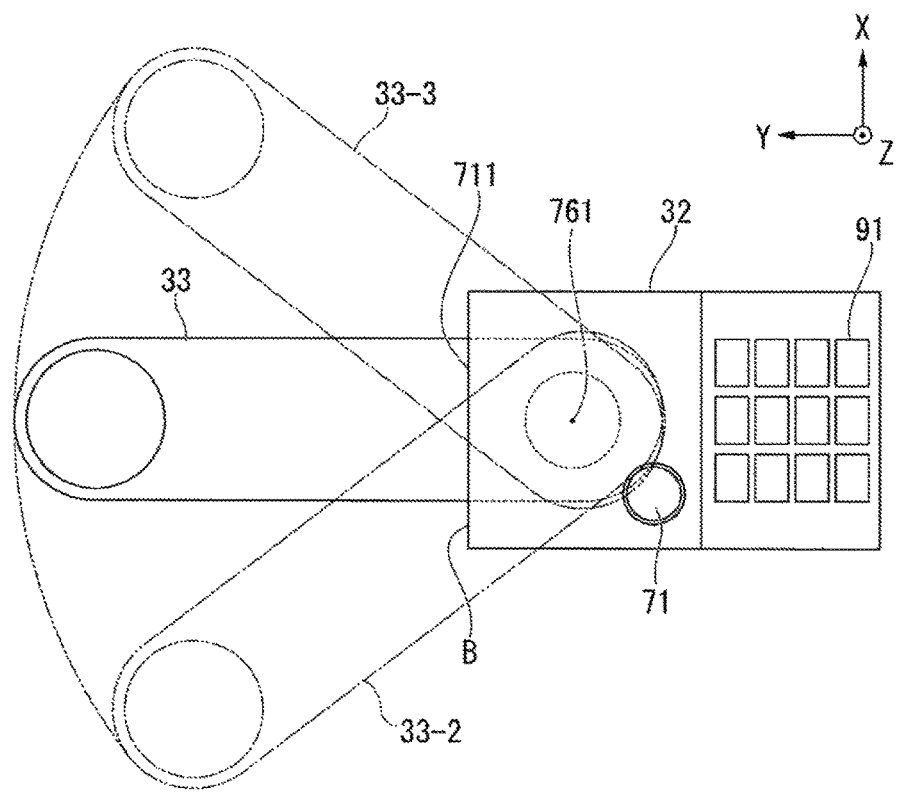
FIG. 11 is a diagram illustrating an example of a relationship between arrangement of the display portions and a movable region of the first arm in the casing of the horizontally articulated robot according to the embodiment of the invention.

FIG. 11 is a diagram illustrating an example of a relationship between arrangement of the display portions 711 and a movable region of the first arm 33 in the casing 32 of the horizontally articulated robot 11 according to the embodiment of the invention.

The example illustrated in FIG. 11 corresponds to the example illustrated in FIG. 10.

For convenience of description, FIG. 11 illustrates an XYZ coordinate system which is the same three-dimensional orthogonal coordinate system as illustrated in FIG. 1. FIG. 11 illustrates the casing 32 in a direction matching arrangement of the horizontally articulated robot 11 illustrated in FIG. 1.

FIG. 11 is a view in which the casing 32 is viewed in a direction which is perpendicular to a plane (in the illustrated example, a plane which is parallel to the XY plane) that the first arm 33 is rotationally moved and a direction (in the illustrated example, a direction directed from the positive side of the Z axis toward the negative side thereof) which is directed from the casing 32 toward the base 31.

FIG. 11 illustrates a position 761 of the rotation shaft during rotational movement of the first arm 33, and also illustrates the first arm 33 located at the center of a rotationally movable range, a first arm 33-2 (which is the same as the first arm 33, and is virtually illustrated in FIG. 11) located at one end of the rotationally movable range, and a first arm 33-3 (which is the same as the first arm 33, and is virtually illustrated in FIG. 11) located at the other end of the rotationally movable range. A range between the first arms 33-2 and 33-3 (which are the same as the first arm 33, and is virtually illustrated in FIG. 11) located at both ends is a movable region (rotationally movable range) of the first arm 33.

In the present embodiment, when viewed in the direction (vice versa in a reverse direction) illustrated in FIG. 11, all of the display portions 711 (the six display portions 711 in the present embodiment) are configured to be included in the movable region of the first arm 33. As another configuration example, when viewed in the direction (vice versa in a reverse direction) illustrated in FIG. 11, some of the display portions 711 (the six display portions 711 in the present embodiment) may be configured to be included in the movable region of the first arm 33.

As mentioned above, in the present embodiment, at least some of the display portions 711 are located in the movable region of the first arm 33 when viewed from the shaft direction of the rotation shaft about which the first arm 33 is rotationally moved.

In this configuration, it is easy to view display performed by the display portions 711 when the casing 32 is viewed from the first arm 33 side toward the casing 32 side (in the illustrated example, when the negative side of the Y axis is viewed from the positive side of the Y axis).

Here, generally, in the horizontally articulated robot 11, a surface (in the illustrated example, a surface in the positive direction of the Y axis and on the surface B side of the casing 32) on which the first arm 33 is provided is also referred to as a "front surface", and a surface (in the illustrated example, a surface in the negative direction of the Y axis and on the surface on which the cover plate 41 is provided) on an opposite side, opposing the front surface, is also referred to as a "rear surface".

Here, in the examples illustrated in FIGS. 10 and 11, the display portions 711 are provided on the front surface side of the horizontally articulated robot 11. In this configuration, the display content of the display portions 711 can be easily viewed, for example, compared with a configuration in which the display portions are provided on the rear surface side of the horizontally articulated robot. For example, in a case where other objects are present on the rear surface side of the horizontally articulated robot 11, the rear surface side of the horizontally articulated robot 11 is disposed near a wall, or a person (for example, a worker) viewing an operation of the horizontally articulated robot 11 is located on the front surface side of the horizontally articulated robot 11, it is easy to view the display content of the display portions 711.

In the examples illustrated in FIGS. 10 and 11, since the display portions 711 are disposed on the front surface side of the casing 32, for example, the display content of the display portions 711 can be easily viewed, and a person (for example, a worker) can easily understand information such as an error warning regarding the occurrence of abnormality.

Figure 12:
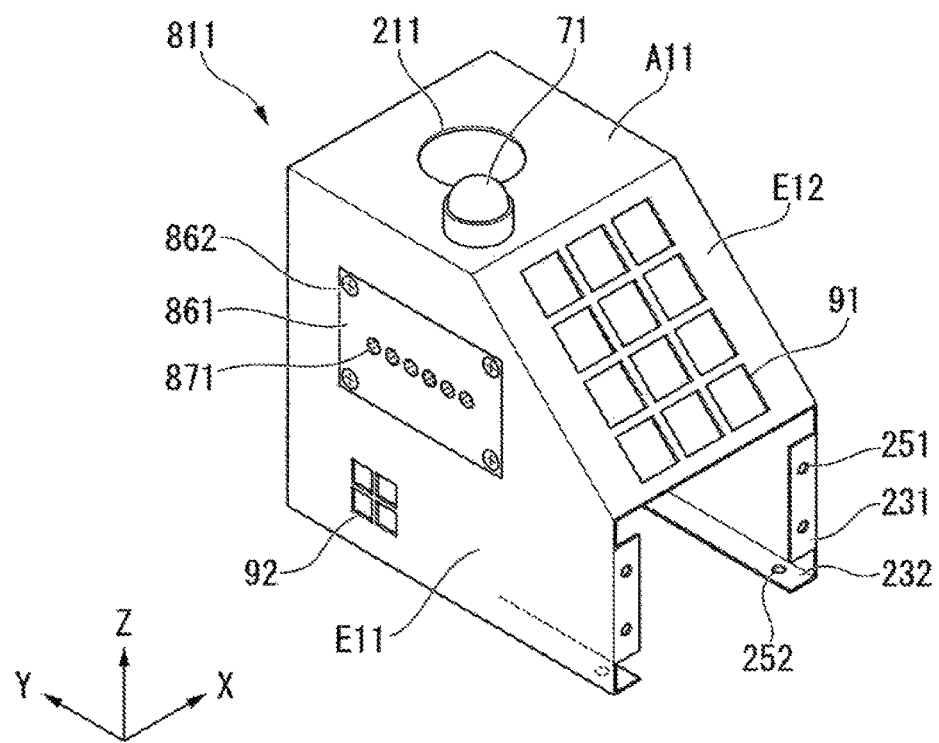
FIG. 12 is a diagram illustrating a schematic configuration example of a modification example of arrangement of display portions in a casing of the horizontally articulated robot according to the embodiment of the invention.

Modification Example of Arrangement of Display Portions in Casing of Horizontally Articulated Robot FIG. 12 is a diagram illustrating a schematic configuration example of a modification example of arrangement of display portions 871 in a casing 811 of the horizontally articulated robot 11 according to the embodiment of the invention.

For convenience of description, FIG. 12 illustrates an XYZ coordinate system which is the same three-dimensional orthogonal coordinate system as illustrated in FIG. 1. FIG. 12 illustrates the casing 811 related to the modification example in a direction matching arrangement of the horizontally articulated robot 11 illustrated in FIG. 1.

Herein, with respect to the casing 811 according to the modification example illustrated in FIG. 12, constituent portions which are different from those of the casing 32 of the horizontally articulated robot 11 illustrated in FIG. 1 will be focused.

FIG. 12 illustrates an outline of the casing 811, and, specifically, in the same configuration as that of the casing 32 illustrated in FIG. 1 (the same for FIG. 3), a cover plate 861 (for example, a lid) having the display portions 871 (in the example illustrated in FIG. 12, six display portions 871) is provided on a single surface E11 among a plurality of surfaces of the casing 811. The surface E11 is a surface on which the openings 92 are provided.

FIG. 12 illustrates the display portions 871, and only one of the six display portions 871 is given the reference numeral. In the example illustrated in FIG. 12, the six display portions 871 are disposed at an equal interval in one row and six columns (any directions of rows and columns may be used) on the surface E11, but other arrangements may be used. In the example illustrated in FIG. 12, the cover plate 861 is disposed at a position closer to a surface A11 (in the illustrated example, on the positive side of the Z axis) than a position where the openings 92 are provided, but other arrangements may be used.

Figure 13:
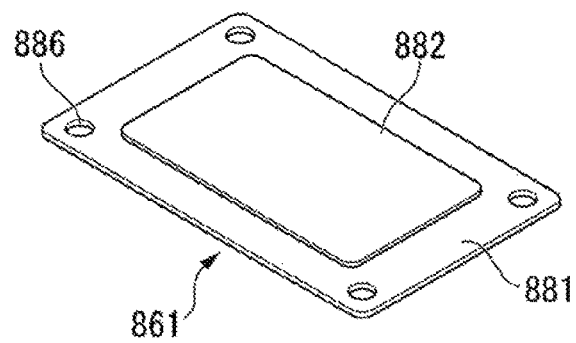
FIG. 13 is a diagram illustrating a schematic configuration example of a cover plate with the display portions in the casing of the horizontally articulated robot according to the embodiment of the invention.

FIG. 13 is a diagram illustrating a schematic configuration example of the cover plate 861 with the display portions 871 in the casing 811 of the horizontally articulated robot 11 according to the embodiment of the invention.

FIG. 13 is a view in which the cover plate 861 illustrated in FIG. 12 is viewed from the hollow inside of the casing 811. In other words, an exterior of the cover plate 861 illustrated in FIG. 12 and an exterior of the cover plate 861 illustrated in FIG. 13 have a reverse relationship.

The cover plate 861 has a frame portion 881 and a substrate 882.

The frame portion 881 is a portion forming a frame of the cover plate 861. In the examples illustrated in FIGS. 12 and 13, the frame portion 881 has a rectangular (or square) outer shape, and is provided with holes (not illustrated) which are smaller than the rectangular outer shape and have shapes similar to each other inside the frame portion 881. The outer shape of the frame portion 881 and the holes are disposed so that, for example, central points thereof overlap each other.

The substrate 882 is provided to cover the holes on the frame portion 881. The frame portion 881 and the substrate 882 are bonded to each other so as to be integrally formed. The display portions 871 are provided on one surface (the surface illustrated in FIG. 12) of the substrate 882. The substrate 882 may be provided with an electric component for causing the display portions 871 to perform display (light emission in the present embodiment), and, in this case, power is supplied to the electric component (and the display portions 871) by the control device 421 (for example, the drive power source board 431 and the power conversion board 432 regarding the supply of power, and the control board 433 regarding control) illustrated in FIG. 5, and a signal (display control signal) for controlling display is transmitted to the display portions 871.

The frame portion 881 has screw holes 886 (a total of four screw holes 886) near vertices of the rectangle. FIG. 13 illustrates the screw holes 886, and only one of a total of four screw holes 886 is given the reference numeral.

Screw holes (not illustrated) of the same number having the same arrangement as the screw holes 886 of the frame portion 881 of the cover plate 861 are provided on the surface E11 of the casing 811 on which the cover plate 861 is provided.

The casing 811 and the cover plate 861 are fixed to each other as a result of being fastened with screws 862 (a total of four screws 862) through the respective screw holes in a state in which positions of the screw holes provided on the surface E11 of the casing 811 overlap positions of the screw holes 886 of the frame portion 881 of the cover plate 861. FIG. 12 illustrates the screws 862, and only one of a total of four screws 862 is given the reference numeral.

For example, the casing 811 and the cover plate 861 may be fixed by using a larger number of screw holes (and screws), and may be fastened by using methods other than screw holes (and screws).

Here, a material of the frame portion 881 of the cover plate 861 may be the same as or different from a material (a material of the surface E11 of the casing 811 on which the cover plate 861 is provided) of the casing 811, for example. A material of the casing 811 may be, for example, a metal.

The surface E11 of the casing 811 on which the cover plate 861 is provided has holes (not illustrated) covered with the cover plate 861 at the location where the cover plate 861 is attached.

The example illustrated in FIG. 12 shows a case where the cover plate 861 is provided on the same surface E11 as the surface on which the openings 92 are provided in the casing 811, but the cover plate 861 may be provided on other surfaces.

In a case of using the casing 811 illustrated in FIG. 12, the cover plate 861 with the display portions 871 is attachable to and detachable from the casing 811 (main body). The cover plate 861 can be disposed to be placed at any location in any direction in a state of being detached from the casing 811 (main body). Consequently, the display content (light in the present embodiment) of the display portions 871 provided on the cover plate 861 can be output from any location in any direction.

In this case, for example, the electric component provided on the substrate 882 of the cover plate 861 and the control device 421 (for example, the drive power source board 431, the power conversion board 432, and the control board 433) accommodated in the casing 811 (main body) may be communicably connected to each other in a wired manner, and may be communicably connected to each other in a wireless manner. In a case where wireless communication is used, there is no signal line, and thus a degree of freedom of arrangement of the cover plate 861 can be increased.

As mentioned above, in the example illustrated in FIG. 12, the cover plate 861 with the display portions 871 can be disposed on any surface among the front surface, the rear surface, and the side surface E11 (which may be, for example, one of two pentagonal surfaces, and may be an oblique surface E12 or a surface A11 connected to the pipe 51 as another example) therebetween.

Here, the example illustrated in FIG. 12 shows a case where the cover plate 861 is attached to and detached from the surface E11 of the casing 811 on which the openings 92 are provided.

As another configuration example, a mechanism portion (for example, the mechanism portion as in the example illustrated in FIG. 12) to and from which the cover plate 861 is attachable and detachable may be provided on any two or more surfaces among the front surface and the rear surface of the casing 811, and the side surfaces therebetween, and, in this case, the cover plate 861 with the display portions 871 can be attached to any surface among two or more surfaces on which the mechanism portion is provided according to a use situation (a layout or the like) of the horizontally articulated robot 11. There may be a configuration in which a cover plate (such as a lid) (not illustrated) not having display portions is attached to close the mechanism portion to which the cover plate 861 having the display portions 871 is not attached.

In the example illustrated in FIG. 12, the display portions 871 is provided on the casing 811, but, as another configuration example, the display portions 871 (for example, the cover plate 861 with the display portions 871) may be provided at any location in the horizontally articulated robot 11, and the display portions 871 (for example, the cover plate 861 with the display portions 871) may be provided on the base 31 or the like.

Installation of Horizontally Articulated Robot

With reference to FIG. 1, a description will be made of installation of the horizontally articulated robot 11.

The horizontally articulated robot 11 may be installed in various directions at various locations.

Installation on Bottom such as Floor

As an example, the horizontally articulated robot 11 may be installed on a bottom such as a floor. The floor or the like may be a stand such as a table. In this case, for example, the base 31 of the horizontally articulated robot 11 is installed on a bottom such as a floor.

In this case, in the XYZ coordinate system illustrated in FIG. 1, the direction from the positive side of the Z axis toward the negative side thereof is a gravitational direction. When applied to an upward-and-downward direction and a leftward-and-rightward direction used generally, the base 31 is located on the lower side, and the casing 32 is located on the upper side. The first arm 33 and the second arm 34 are rotationally moved on a plane perpendicular to the upward-and-downward direction, and the operation unit 35 is linearly moved in the upward-and-downward direction. In a case where the operation unit 35 is rotationally moved, the operation unit 35 is rotationally moved on a plane perpendicular to the upward-and-downward direction.

Installation on Top such as Ceiling

As an example, the horizontally articulated robot 11 may be installed on a top such as a ceiling. In this case, for example, the base 31 of the horizontally articulated robot 11 is installed on a top such as a ceiling.

In this case, in the XYZ coordinate system illustrated in FIG. 1, the direction from the negative side of the Z axis toward the positive side is a gravitational direction. When applied to an upward-and-downward direction and a leftward-and-rightward direction used generally, the base 31 is located on the upper side, and the casing 32 is located on the lower side. The first arm 33 and the second arm 34 are rotationally moved on a plane perpendicular to the upward-and-downward direction, and the operation unit 35 is linearly moved in the upward-and-downward direction. In a case where the operation unit 35 is rotationally moved, the operation unit 35 is rotationally moved on a plane perpendicular to the upward-and-downward direction.

Installation on Lateral Side such as Wall

As an example, the horizontally articulated robot 11 may be provided on a lateral side such as a wall. In this case, for example, the base 31 of the horizontally articulated robot 11 is installed on a lateral side such as a wall.

In this case, in the XYZ coordinate system illustrated in FIG. 1, a gravitational direction is included in the XY plane. When applied to an upward-and-downward direction and a leftward-and-rightward direction used generally, the base 31 and the casing 32 are located at the same height in the upward-and-downward direction. The first arm 33 and the second arm 34 are rotationally moved on a plane which is parallel to the lateral side such as a wall, and the operation unit 35 is linearly moved in a direction perpendicular to the lateral side such as a wall. In a case where the operation unit 35 is rotationally moved, the operation unit 35 is rotationally moved on a plane which is parallel to the lateral side such as a wall.

Installation on Other Faces

The horizontally articulated robot 11 may be installed on any other face.

Brief of Embodiment

As one configuration, a horizontally articulated robot (the horizontally articulated robot 11 in the example illustrated in FIG. 1, the horizontally articulated robot 511 in the example illustrated in FIG. 8, and the horizontally articulated robot 611 in the example illustrated in FIG. 9) includes a base (the base 31 in the example illustrated in FIG. 1, the base 531 in the example illustrated in FIG. 8, and the base 631 in the example illustrated in FIG. 9), a first arm (the first arm 33 in the example illustrated in FIG. 1, the first arm 533 in the example illustrated in FIG. 8, and the first arm 633 in the example illustrated in FIG. 9) provided on the base, and a control device (the control device 421 in the example illustrated in FIG. 5) controlling the first arm, and at least a part of the control device is located inside the base.

As one configuration, in the horizontally articulated robot, the first arm is directly or indirectly provided at the base so as to be rotationally moved about a first rotation shaft (a rotation shaft of the first arm), and the horizontally articulated robot further includes a first casing (the casing 32 in the example illustrated in FIG. 1, the casing 532 in the example illustrated in FIG. 8, the casing 632 in the example illustrated in FIG. 9, and the casing 811 in the example illustrated in FIG. 12) having a portion which overlaps the base when viewed from a shaft direction of the first rotation shaft.

As one configuration, in the horizontally articulated robot, the control device includes the power source board 430 (the drive power source board 431 and the power conversion board 432 in the example illustrated in FIG. 5) that supplies power to a first drive unit (a drive unit including the motor control board 451-1, the amplification unit 453-1, and the motor 471-1 in the example illustrated in FIG. 5) driving the first arm, and at least apart (the power conversion board 432 in the example illustrated in FIG. 6) of the power source board 430 is located inside the first casing.

As one configuration, in the horizontally articulated robot, the control device includes a control board (the control board 433 in the examples illustrated in FIGS. 5 and 6, and control board 591 in the example illustrated in FIG. 8, and the control board 691 in the example illustrated in FIG. 9) controlling the first drive unit, and the control board is located inside the base.

As one configuration, in the horizontally articulated robot, the first drive unit is located inside the first casing (for example, FIG. 8).

As one configuration, in the horizontally articulated robot, the first drive unit includes a motor (the motor 471-1 in the example illustrated in FIG. 5), and an amplification unit (the amplification unit 453-1 in the example illustrated in FIG. 5) having a drive circuit driving the motor, and the amplification unit is provided in the motor.

As one configuration, the horizontally articulated robot further includes display portions (the display portions 711 in the example illustrated in FIG. 10, and the display portions 871 in the example illustrated in FIG. 12) provided on the first casing.

As one configuration, in the horizontally articulated robot, the display portions are located on a front surface of the first casing (for example, FIG. 10).

As one configuration, in the horizontally articulated robot, the display portions include a portion located in a movable region of the first arm when viewed from the shaft direction of the first rotation shaft (for example, FIG. 11).

As one configuration, in the horizontally articulated robot, a position where the display portions are provided on the first casing can be changed (for example, FIG. 12).

As one configuration, in the horizontally articulated robot, the first casing includes openings (the openings 91 and 92 in the example illustrated in FIG. 1).

As one configuration, the horizontally articulated robot further includes a second arm (the second arm 34 in the example illustrated in FIG. 1, the second arm 534 in the example illustrated in FIG. 8, and the second arm 634 in the example illustrated in FIG. 9) that is provided at the first arm so as to be rotationally moved about a second rotation shaft (a rotation shaft of the second arm), and a protection member (the pipe 51 in the example illustrated in FIG. 1, and the pipe 551 in the example illustrated in FIG. 8) that connects the first casing and the second arm to each other.

As one configuration, in the horizontally articulated robot, a first connection position (the connection position A1 in the example illustrated in FIG. 7) between the first casing and the protection member and a second connection position (the connection position A2 in the example illustrated in FIG. 7) between the second arm and the protection member are the same as each other in terms of a position (a position of the reference line H1 in the example illustrated in FIG. 7) in the shaft direction of the first rotation shaft.

As one configuration, in the horizontally articulated robot, the first connection position is located on an axis of the first rotation shaft (for example, FIG. 7 or 8).

A program for realizing a function of any constituent element of the above-described device (for example, the control device 421) may be recorded (stored) on (in) a computer readable recording medium (storage medium), and the program may be read to a computer system so as to be executed. The "computer system" mentioned here is assumed to include an operating system (OS) or hardware such as peripheral devices. The "computer readable recording medium" indicates a portable medium such as a flexible disc, a magneto-optical disc, a read only memory (ROM), or a compact disc (CD)-ROM, and a storage device such as a hard disk built into the computer system. The "computer readable recording medium" is also assumed to include a memory holding the program for a certain period of time, such as an internal volatile memory (random access memory (RAM)) of the computer system serving as a server or a client in a case where the program is transmitted via a network such as the Internet or a communication line such as a telephone line.

The program may be transmitted from a computer system in which the program is stored in a storage device or the like to another computer system via a transmission media or by using a carrier wave in the transmission medium. Here, the "transmission medium" for transmitting the program includes a medium having a function of transmitting information, such as a network (communication network) such as the Internet or a communication line such as a telephone line.

The program may realize some of the above-described functions. The program may be a so-called differential file (differential program) which can realize the above-described functions in combination with a program which has already been recorded in the computer system.

As mentioned above, the embodiment of the invention has been described in detail with reference to the drawings, but specific configurations are not limited to this embodiment, and also include design or the like within the scope without departing from the spirit of the invention.

The above-described embodiment may be applied to a horizontally articulated robot having any configuration. For example, the number of operation shafts of a horizontally articulated robot may be any number.

The entire disclosures of Japanese Patent Application Nos. 2016-105475, filed May 26, 2016 and 2017-027042, filed Feb. 16, 2017 are expressly incorporated by reference herein.

What is claimed is:

1. A horizontally articulated robot comprising:
a base having a casing attached to a top surface;
a first arm provided in a notch in the base and extending horizontally from the base, the casing extending over the notch in the base when viewed in a plan view from the top surface of the base;
a control device controlling the first arm;
a first driver driving the first arm, the first driver being provided in the casing; and
a power source board supplying power to the first driver,
wherein the control device is disposed within an outer shell of the base,
the first arm is rotationally moved about the first rotation shaft,
the base is a pedestal,
the first arm is rotationally connected to the pedestal at the first rotation shaft,
the casing includes a portion overlapping the pedestal when viewed from a shaft direction of the first rotation shaft,
the control device includes the power source board, and
the power source board is provided in the base.

2. The horizontally articulated robot according to claim 1,
wherein the control device further includes a control board controlling the first driver, and
wherein the control board is disposed inside the pedestal.

3. The horizontally articulated robot according to claim 1, wherein the first driver is disposed inside the casing.

4. The horizontally articulated robot according to claim 1,
wherein the first driver includes a motor and an amplification unit, the amplification unit including a drive circuit driving the motor, and
wherein the amplification unit is disposed in the motor.

5. The horizontally articulated robot according to claim 1, further comprising:
a display disposed on an outer surface of the casing.

6. The horizontally articulated robot according to claim 5,
wherein the display is disposed on a front surface of the casing.

7. The horizontally articulated robot according to claim 5,
wherein the display has a portion disposed on a movable region of the first arm when viewed from the shaft direction of the first rotation shaft.

8. The horizontally articulated robot according to claim 5,
wherein a position where the display is provided on the casing can be changed.

9. The horizontally articulated robot according claim 1, further comprising:
a pipe opening configured to receive a pipe housing a wiring,
wherein the casing has an opening, the opening being different from the pipe opening.

10. The horizontally articulated robot according to claim 1, further comprising:
a second arm rotatably connected to the first arm so as to be rotationally moved about a second rotation shaft; and
a wire casing connecting the casing to the second arm.

11. The horizontally articulated robot according to claim 10,
wherein a first connection position between the casing and the wire casing and a second connection position between the second arm and the wire casing have the same position in the shaft direction of the first rotation shaft.

12. The horizontally articulated robot according to claim 11,
wherein the first connection position is located on an axis of the first rotation shaft.

* * * * *